United States Patent
Yamamoto

(10) Patent No.: US 8,368,677 B2
(45) Date of Patent: Feb. 5, 2013

(54) OPTICAL SENSOR DEVICE, DISPLAY APPARATUS, AND METHOD FOR DRIVING OPTICAL SENSOR DEVICE

(75) Inventor: Takumi Yamamoto, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 128 days.

(21) Appl. No.: 13/075,203

(22) Filed: Mar. 30, 2011

(65) Prior Publication Data

US 2011/0242075 A1   Oct. 6, 2011

(30) Foreign Application Priority Data

Mar. 31, 2010  (JP) ................ 2010-083740
Mar. 31, 2010  (JP) ................ 2010-083743
Nov. 29, 2010  (JP) ................ 2010-265380

(51) Int. Cl.
*G06F 3/038* (2006.01)
*G09G 5/00* (2006.01)

(52) U.S. Cl. ........ 345/207; 345/690; 345/697; 345/175; 178/18.09

(58) Field of Classification Search .............. 345/156, 345/157, 163, 166, 175, 204, 207, 690, 697; 178/18.01, 18.03, 18.09
See application file for complete search history.

(56) References Cited

U.S. PATENT DOCUMENTS

| | | | |
|---|---|---|---|
| 6,919,552 B2 | 7/2005 | Flower | |
| 7,671,833 B2 | 3/2010 | Lee et al. | |
| 8,004,484 B2 * | 8/2011 | Tateuchi et al. | 345/92 |
| 2006/0119590 A1 | 6/2006 | Park et al. | |
| 2007/0052874 A1 | 3/2007 | Nakamura | |
| 2007/0205999 A1 | 9/2007 | Akimoto et al. | |
| 2008/0122804 A1 | 5/2008 | Kinoshita et al. | |
| 2008/0198143 A1 | 8/2008 | Kinoshita et al. | |
| 2008/0278458 A1 * | 11/2008 | Masuzawa et al. | 345/174 |
| 2010/0117980 A1 | 5/2010 | Lee et al. | |
| 2010/0207889 A1 | 8/2010 | Chen et al. | |

FOREIGN PATENT DOCUMENTS

| | | |
|---|---|---|
| JP | 2004-179651 A | 6/2004 |
| JP | 2006-154815 A | 6/2006 |
| JP | 2006-317682 A | 11/2006 |

(Continued)

OTHER PUBLICATIONS

Japanese Office Action dated Apr. 24, 2012 (and English translation thereof) in counterpart Japanese Application No. 2010-083740.

(Continued)

*Primary Examiner* — Lun-Yi Lao
*Assistant Examiner* — Insa Sadio
(74) *Attorney, Agent, or Firm* — Holtz, Holtz, Goodman & Chick, PC

(57) ABSTRACT

An optical sensor device includes a plurality of optical sensor units two-dimensionally arranged, a scan driver, and a detection driver. The scan driver sets optical sensor units, in each row, in a selected state. The detection driver acquires detection signals corresponding to illuminance of incident light on the optical sensor units. Each of the optical sensor units comprises a first optical sensor including a first photoelectric conversion section blocked from light and a second optical sensor including a second photoelectric conversion section configured to change the illuminance in response to an externally applied external force. The detection driver maintains each voltage of electrodes of the first optical sensors and each voltage of electrodes of the second optical sensors in equal voltage levels to each other, and acquires a plurality of voltage signals in parallel.

29 Claims, 26 Drawing Sheets

FOREIGN PATENT DOCUMENTS

| | | |
|---|---|---|
| JP | 2007-072318 A | 3/2007 |
| JP | 2007-241358 A | 9/2007 |
| JP | 2008-096553 A | 4/2008 |
| JP | 2008-134293 A | 6/2008 |
| JP | 2008-203504 A | 9/2008 |
| JP | 2008-281616 A | 11/2008 |
| JP | 2009-036946 A | 2/2009 |
| JP | 2009-047964 A | 3/2009 |
| JP | 2009-87961 A | 4/2009 |
| JP | 2009-187342 A | 8/2009 |
| JP | 2009-276710 A | 11/2009 |
| JP | 2010-191948 A | 9/2010 |
| KR | 10-2006-0056634 A1 | 5/2006 |

OTHER PUBLICATIONS

Japanese Office Action dated May 22, 2012 (and English translation thereof) in counterpart Japanese Application No. 2010-265380.

Korean Office Action dated Jul. 31, 2012 (and English translation thereof) in counterpart Korean Application No. 10-2011-0029053.

\* cited by examiner

OPTICAL SENSOR DEVICE, DISPLAY APPARATUS, AND METHOD FOR DRIVING OPTICAL SENSOR DEVICE

CROSS-REFERENCE TO RELATED APPLICATIONS

This application is based upon and claims the benefit of priority from prior Japanese Patent Applications No. 2010-083740, filed Mar. 31, 2010; No. 2010-083743, filed Mar. 31, 2010; and No. 2010-265380, filed Nov. 29, 2010, the entire contents of all of which are incorporated herein by reference.

BACKGROUND OF THE INVENTION

1. Field of the Invention

The invention relates to an optical sensor device, a display apparatus, and a method for driving the optical sensor device, and in particular, to an optical sensor device suitable for a two-dimensional sensor such as a touch panel built into a display apparatus, and a method for driving the optical sensor device.

2. Description of the Related Art

An optical sensor made by a thin-film transistor (an optical sensor of a thin-film transistor type) detects a photoelectric current signal resulting from incidence of light on the optical sensor with a predetermined potential (normally a negative potential) applied to a gate of the thin-film transistor. The photoelectric current flows between a drain and a source of the thin-film transistor and is hereinafter referred to as a drain current. In recent years, various proposals have been made for a photodetection touch sensor constructed by incorporating such optical sensors into a display panel of a display apparatus.

Here, it is known that particularly a thin-film transistor (a-Si TFT) using amorphous silicon has its electrical characteristics changed by temporal changes or temperature changes. When such a temporal change or a temperature change occurs, a drain current output by the thin-film transistor before the change differs from that output by the thin-film transistor after the change, even with no change in the illuminance of incident light on the thin-film transistor. Such a change in the drain current from the thin-film transistor affects photodetection. Thus, if such a thin-film transistor is used as a touch sensor, a touch position may be erroneously detected or detection sensitivity may vary. Thus, the touch sensor may fail to operate stably.

Jpn. Pat Appln. KOKAI Publication No. 2009-87961 describes a configuration of an optical sensor that can control a change in drain current caused by a time-dependent degradation or a temperature-dependent change in the thin-film transistor. Jpn. Pat Appln. KOKAI Publication No. 2009-87961 describes the configuration corresponding to one optical sensor.

However, if the optical sensor is utilized as a two-dimensional sensor such as a touch panel, optical sensors need to be two-dimensionally arranged.

It is assumed that optical sensors are two-dimensionally arranged as described above. Then, if such a configuration as described in Jpn. Pat Appln. KOKAI Publication No. 2009-87961 is applied as an optical sensor and optical sensors are arranged so as to obtain high detection sensitivity, then an area required for interconnects connected to the optical sensors increases. Thus, the display quality of the display panel may be degraded. Furthermore, if the sensors and the interconnects connected to the sensors are arranged so as to avoid degrading the display quality, a sufficient number of optical sensors cannot be arranged. Hence, appropriate detection sensitivity cannot be achieved. Thus, it is difficult for the optical sensors to achieve appropriate detection sensitivity without degrading the display quality.

BRIEF SUMMARY OF THE INVENTION

The invention can advantageously provide an optical sensor device comprising optical sensors two-dimensionally arranged on a substrate, the optical sensor device enabling the adverse effect, on the detection sensitivity of the optical sensors, of time degradation and temperature changes in the optical sensors, and also provide a method for driving the optical sensor device. Furthermore, the invention can advantageously provide a display apparatus comprising display pixels two-dimensionally arranged on a substrate and optical sensors also two-dimensionally arranged on the substrate, the display apparatus allowing the optical sensors to achieve appropriate detection sensitivity without degrading display quality.

According to a first aspect of the invention, there is provided an optical sensor device comprising: a first substrate; a plurality of optical sensor units two-dimensionally arranged on a surface of the first substrate; a scan driver which sets the optical sensor units disposed in each row in a selected state; and a detection driver which acquires detection signals corresponding to illuminance of incident light on the optical sensor units set in the selected state, wherein each of the optical sensor units comprises a first optical sensor including a first photoelectric conversion section blocked from light and a second optical sensor including a second photoelectric conversion section configured to change the illuminance in response to an externally applied external force, and the detection driver maintains each voltages of electrodes of the first optical sensors and each voltages of electrodes of the second optical sensors, which are set in the selected state, in equal voltage levels to each other, and acquires a plurality of voltage signals in parallel as the detection signals, wherein each of the voltage signals is correspond to current flowing in accordance with the illuminance on each of the second optical sensors set in the selected state.

According to a second aspect of the invention, there is provided a display apparatus comprising: a substrate; a plurality of display pixels two-dimensionally arranged on a surface of the substrate; a plurality of optical sensor units two-dimensionally arranged on the surface of the substrate, each of the display pixels comprising an optical element; a scan driver which sets the optical sensor units disposed in each row in a selected state; and a detection driver which acquires detection signals corresponding to illuminance of incident light on the optical sensor units set in the selected state, wherein each of the optical sensors comprise units a first optical sensor including a first photoelectric conversion section blocked from light and a second optical sensor including a second photoelectric conversion section configured to change the illuminance in response to an externally applied external force, and the detection driver maintains each voltages of electrodes of the first optical sensors and each voltages of electrodes of the second optical sensors, which are set in the selected state, in equal voltage levels to each other, and acquires a plurality of voltage signals in parallel as the detection signals, wherein each of the voltage signals is correspond to current flowing in accordance with the illuminance on the second optical sensor set in the selected state.

According to a third aspect of the invention, there is provided a display apparatus comprising: a substrate; a plurality of display pixels which are two-dimensionally arranged on the surface of the substrate and each have an optical element; and a plurality of optical sensor units two-dimensionally arranged on the surface of the substrate, each of the display pixels comprising an optical element, wherein each of the optical sensor units comprises a first optical sensor including a first semiconductor layer blocked from light and a second optical sensor including a second semiconductor layer configured to change the illuminance in response to an externally applied external force, the display pixels comprise a predetermined number of subpixels in different colors disposed in the row direction, and the first optical sensors and the second optical sensors are each provided in an area between the display pixels disposed in the row direction.

According to a fourth aspect of the invention, there is provided a method for driving an optical sensor device comprising a plurality of optical sensor units two-dimensionally arranged, each of the optical sensor units comprising a first optical sensor including a first semiconductor layer blocked from light and a second optical sensor including a second semiconductor layer configured to change an illuminance of incident light in response to an externally applied external force, the method comprising: setting the first optical sensors and the second optical sensors disposed in each of the rows in a selected state; and maintaining each voltages of electrodes of the first optical sensors and second optical sensors and each voltages of electrodes of the second optical sensors, which are set in the selected state, in equal voltage levels to each other, and then acquiring a plurality of voltage signals in parallel, the voltage signals corresponding to currents flowing in accordance with the illuminance on the second optical sensors.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the invention will be described below with reference to the drawings.

<First Embodiment>

First, a first embodiment of the invention will be described.

Figure 1:
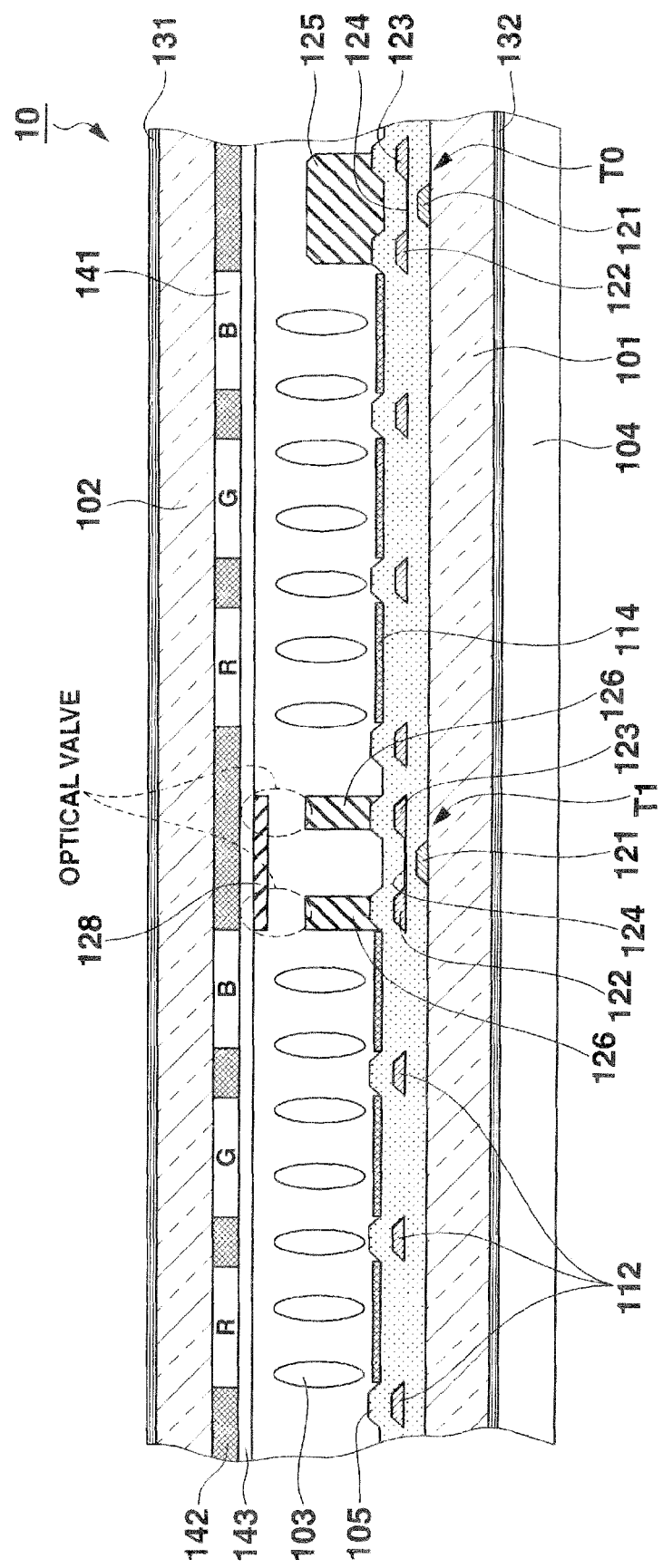
FIG. 1 is a diagram showing an example of a cross-sectional structure of a display panel comprising an optical sensor device according to a first embodiment the invention.

FIG. 1 is a diagram showing an example of the cross-sectional structure of a display panel 10 comprising an optical sensor device according to a first embodiment of the invention.

Figure 2:
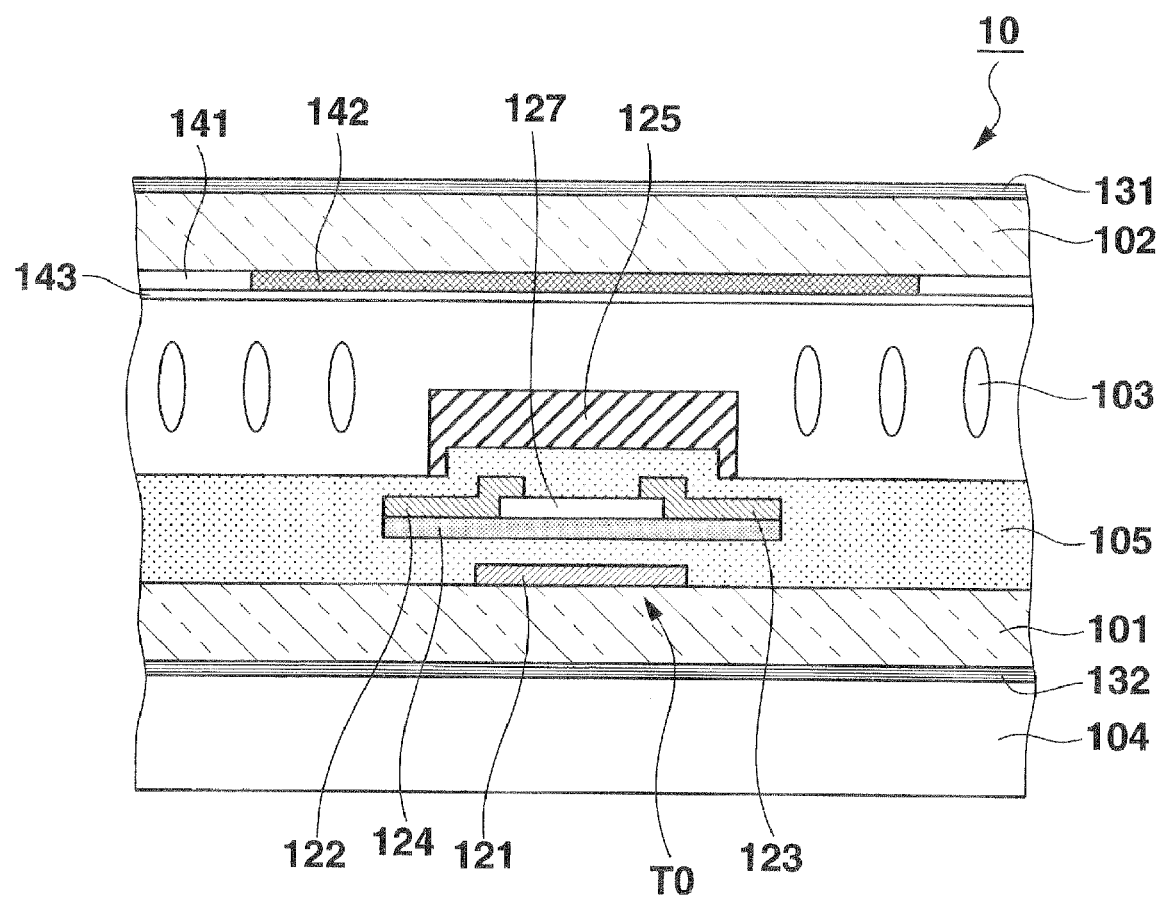
FIG. 2 is a diagram showing a configuration of a thin-film transistor sensor T0 provided in a display panel.

FIG. 2 is a diagram showing a configuration of a TFT sensor T0 provided in the display panel 10.

Figure 3A:
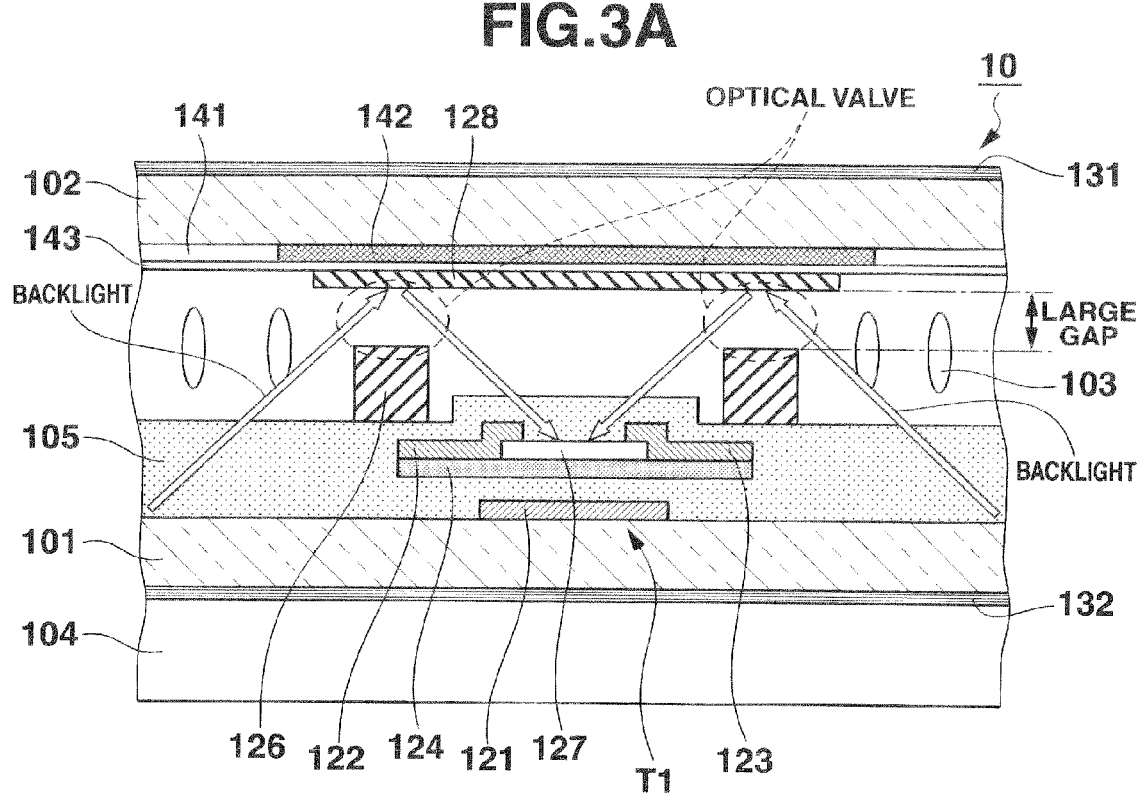
FIG. 3A is a diagram showing a configuration of a thin-film transistor sensor T1 provided in a display panel and illustrating that a user's finger or the like is not touching the display panel 10.
Figure 3B:
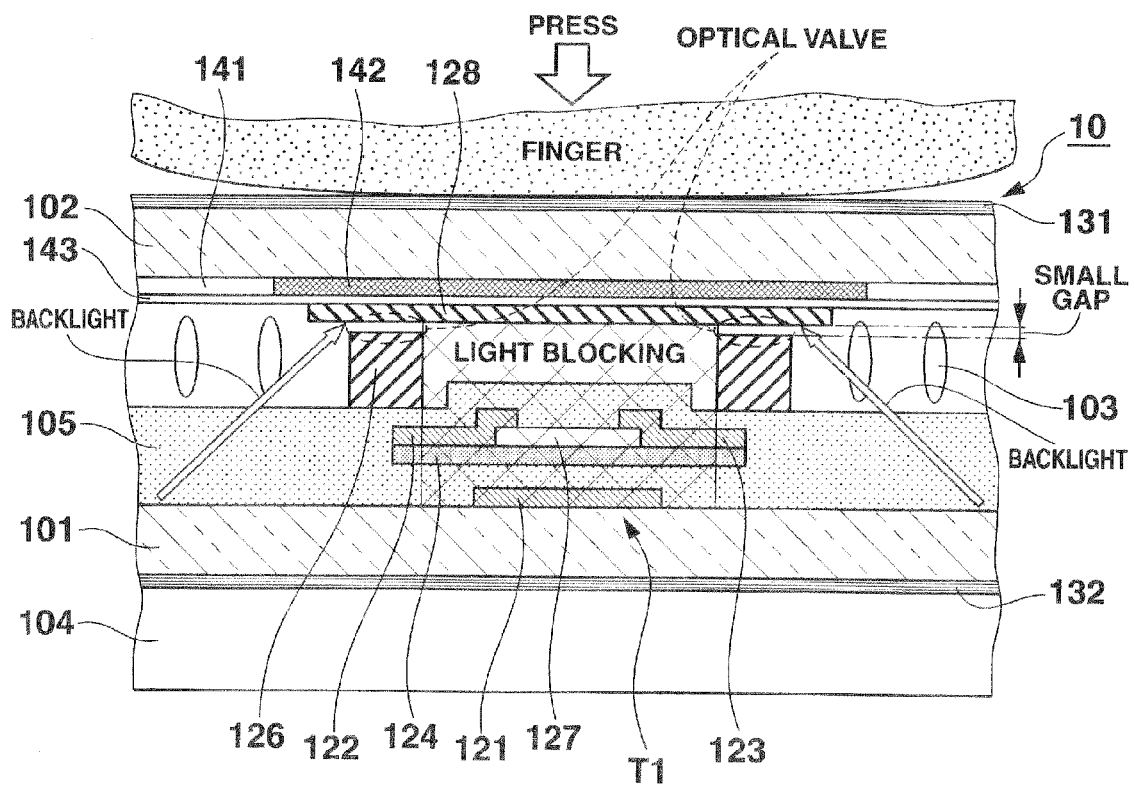
FIG. 3B is a diagram showing the configuration of TFT sensor T1 provided in the display panel and illustrating that the user's finger or the like is touching the display panel 10.

FIGS. 3A and 3B are diagrams showing a configuration of a TFT sensor T1 provided in the display panel 10. FIG. 3A shows that a user's finger or the like is not touching the display panel 10. FIG. 3B shows that the user's finger or the like is touching the display panel 10.

Figure 4:
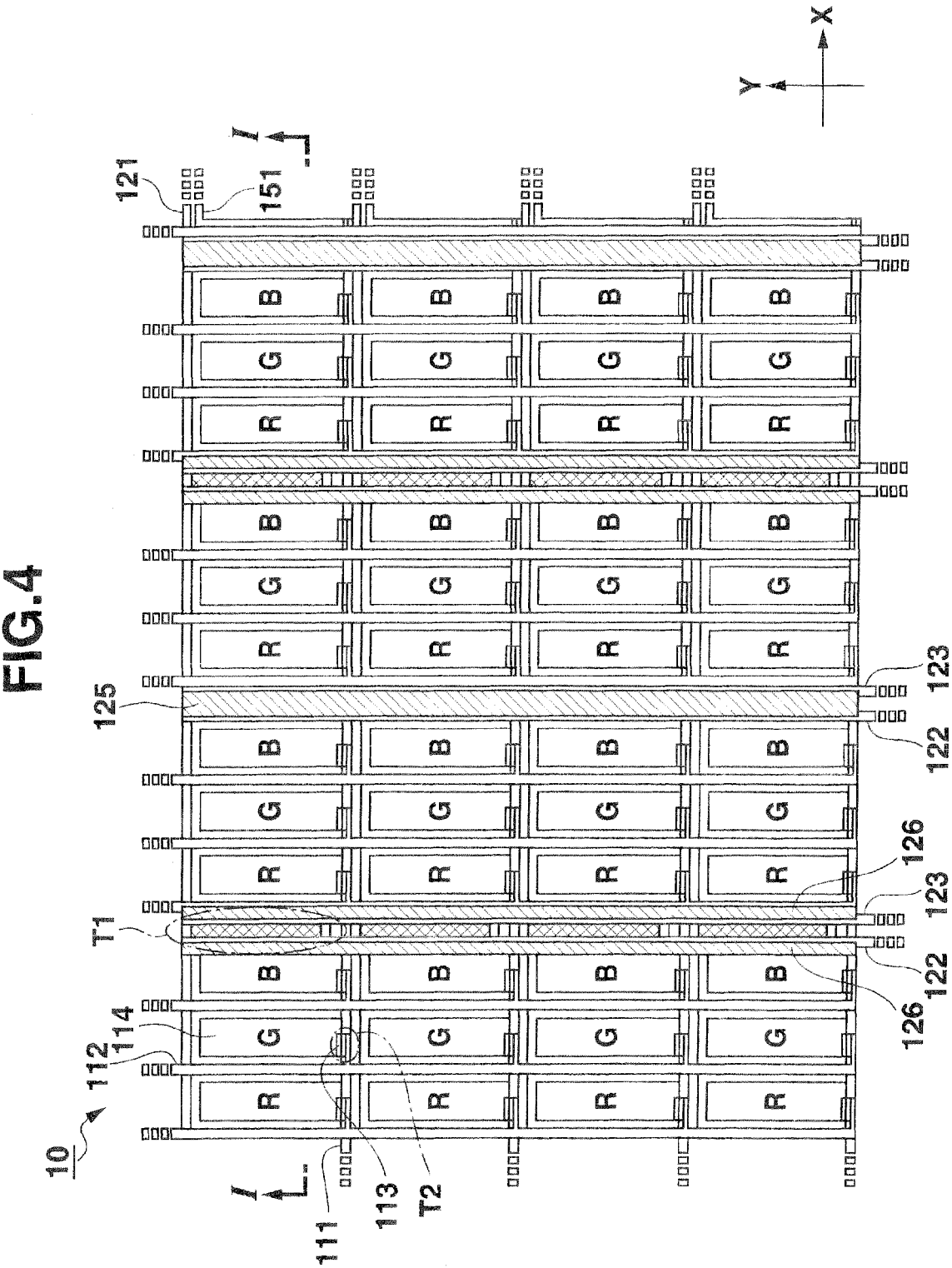
FIG. 4 is a front view of the display panel comprising an optical sensor device according to a first embodiment of the invention.

FIG. 4 is a front view of the display panel comprising the optical sensor device according to the first embodiment of the invention.

FIG. 1 is a cross-sectional view of the display panel 10 taken along direction I-I shown in FIG. 4.

The display panel 10 shown in FIG. 1 includes built-in plural optical sensor units of the thin-film transistor type and forms a liquid crystal display apparatus.

The display panel 10 according to the present embodiment includes a TFT substrate (a first substrate) 101 and a color filter substrate (a second substrate) 102. A liquid crystal 103 is sealed between the TFT substrate 101 and the color filter substrate 102.

Moreover, a backlight 104 serving as a light source is provided on the lower surface of the TFT substrate 101. The display panel 10 is thus configured such that the TFT substrate 101 can be illuminated with, for example, white light through the rear surface of the TFT substrate 101.

Furthermore, polarizing plates 131 and 132 with orthogonal polarization directions are provided respectively on the upper surface of the color filter substrate 102, which corresponds to a visual field side, and on the lower surface of the TFT substrate 101, which is opposite the backlight 104.

The TFT substrate 101, a first substrate, is formed of a transparent substrate such as a glass substrate. Pixels TFT-T2, gate lines (scan lines) 111, and drain lines (signal lines) 112 forming the liquid crystal display apparatus are provided on the upper surface of the TFT substrate 101. Furthermore, plural optical sensor units of the thin-film-transistor type forming the optical sensor device according to the present embodiment are provided on the upper surface of the TFT substrate 101. Each of the optical sensor units of the thin-film-transistor type includes a pair of a TFT sensor T0 and a TFT sensor T1.

On the upper surface of the TFT substrate 101, TFT sensors T0 and T1 are two-dimensionally arranged and sensor gate lines 121, sensor drain lines (first-sensor-first-signal-lines, second-sensor-first-signal-lines) 122, and sensor source lines (first-sensor-second-signal-lines, second-sensor-second-signal-lines) 123 are provided.

In cross section I-I in FIG. 1, pixels TFT-T2 are not seen but only the drain lines 112 are seen.

Each of the drain lines 112 is connected to a drain electrode of TFT-T2. However, the drain line 112 substantially also forms a drain electrode of the pixel TFT-T2. Thus, the drain line 112 is hereinafter also referred to as the drain electrode of the pixel TFT-T2.

Furthermore, as shown in FIG. 4, each of the gate lines 111 is connected to a gate electrode of TFT-T2. However, the gate line 111 substantially also forms a gate electrode of the pixel TFT-T2. Thus, the gate line 111 is hereinafter also referred to as the gate electrode of the pixel TFT-T2.

Here, the gate line 111 is disposed along a row direction (X-direction shown in FIG. 4) of the TFT substrate 101. The drain line 112 is disposed along a column direction (Y-direction shown in FIG. 4) of the TFT substrate 101.

The optical sensor units of the thin-film-transistor type include first optical sensors of the thin-film-transistor type and second optical sensors of the thin-film-transistor type.

As shown in FIG. 2, TFT sensor T0, serving as the first optical sensor of the thin-film-transistor type, includes the gate electrode 121, the drain electrode 122, the source electrode 123, a photoelectric conversion section 124, and a channel protection film 127. TFT sensor T0 comprises an n-channel TFT. The photoelectric conversion section 124 includes a semiconductor layer formed of an amorphous silicon (a-Si) film. The channel protection film 127 includes a transparent insulating film.

The gate electrode 121 of TFT sensor T0 is formed to extend along the row direction (X-direction) of the display panel 10 so as to form a sensor gate line 121. Additionally, the gate electrode 121 of TFT sensor T0 is connected to a gate terminal of a sensor driver described below.

Furthermore, the drain electrode 122 and source electrode 123 of TFT sensor T0 are each formed to extend along the column direction (Y-direction) of the display panel 10 so as to form a sensor source line 123. The drain electrode 122 and source electrode 123 of TFT sensor T0 are connected to a drain terminal and a source terminal, respectively, of the sensor driver described below.

Furthermore, a light blocking wall 125 made of a light blocking material, for example, metal or resin, is formed at a position where the light blocking wall 125 can cover the photoelectric conversion section 124 of TFT sensor T0.

The electrodes and photoelectric conversion section 124 of TFT sensor T0 are insulated by the transparent insulating film 105.

In TFT sensor T0 configured as described above, as shown in FIG. 2, the photoelectric conversion section 124 is prevented by the light blocking wall 125 from receiving light. Thus, light emitted by the backlight 104 and external light are prevented from being incident on the photoelectric conversion section 124 of TFT sensor T0. Thus, TFT sensor T0 constantly outputs a photocurrent signal (drain current Ids0) corresponding to a dark current even in a selected state in which TFT sensor T0 is turned on.

As shown in FIG. 3A, TFT sensor T1, serving as the second optical sensor of the thin-film-transistor type, includes the gate electrode 121, the drain electrode 122, the source electrode 123, the photoelectric conversion section 124, and the channel protection film 127. TFT sensor T1 comprises an n-channel TFT. The photoelectric conversion section 124 includes a semiconductor layer formed of an a-Si film. The channel protection film 127 includes a transparent insulating film.

The gate electrode 121 of TFT sensor T1 is formed to extend along the row direction of the display panel 10 so as to form a sensor gate line 121. The gate electrode 121 of TFT sensor T1 is connected to the gate terminal of the sensor driver described below.

Furthermore, the drain electrode 122 and source electrode 123 of TFT sensor T1 are each formed to extend along the column direction of the display panel 10 so as to form a sensor source line 123. The drain electrode 122 and source electrode 123 of TFT sensor T1 are connected to the drain terminal and source terminal, respectively, of the sensor driver described below.

Furthermore, a light blocking wall 126 is formed to surround the photoelectric conversion section 124 of TFT sensor T1. The light blocking wall 126 is formed a material that blocks at least visible light, for example, metal or resin. The light blocking wall 126 has a height determined so as to form a predetermined gap (hereinafter referred to as an optical valve) between the upper end and the color filter substrate 102. The height corresponds to the length of the TFT substrate 101 in a direction perpendicular to the planar direction of the upper surface of the TFT substrate 101.

Moreover, the electrodes and photoelectric conversion section 124 of TFT sensor T1 are insulated by the transparent insulating film 105.

In TFT sensor T1 configured as described above, as shown in FIG. 3A, the optical valve is open while the color filter substrate 102 is not pressed by an external force exerted by the user's finger. In this state, the photoelectric conversion section 124 of TFT sensor T1 is exposed. Thus, light emitted by the backlight 104 or external light enters the photoelectric conversion section 124 of TFT sensor T1 via the optical valve. Thus, TFT sensor T1 constantly outputs a drain current corresponding to the illuminance of the incident light in a selected state in which TFT sensor T1 is turned on.

On the other hand, if a depressing pressure is applied to the color filter substrate by an external force exerted by the user's finger or the like, then as shown in FIG. 3B, the color filter substrate 102 is partly flexed and deformed to close the optical valve. When the optical valve is closed, the gap between the color filter substrate 102 and the light blocking wall 126 is sufficiently narrow or no gap is present between the color filter substrate 102 and the light blocking wall 126. In this state, the photoelectric conversion section 124 of TFT sensor T1 is in a light blocking state in which the light emitted by the backlight 104 is prevented from being incident on the photoelectric conversion section 124. Thus, TFT sensor T1 outputs the drain current Ids0 corresponding to a dark current.

As shown in FIG. 1 and FIG. 3A, a reflection film 128 such as an aluminum thin film is formed on a surface of the color filter substrate 102 which is located opposite the TFT substrate 101; the reflection film 128 lies opposite the TFT substrate 101 of the color filter substrate 102. The reflection film 128 allows light emitted by the backlight 104 or external light to efficiently enter the photoelectric conversion section 124 of TFT sensor T1.

The reflection film 128 may be omitted, and instead a light blocking film 142 described below and formed on the color filter substrate 102 may be used as a reflection film.

The pixel TFT-T2 includes the gate electrode 111, the drain electrode 112, and the source electrode 113.

The gate electrode 111 of the pixel TFT-T2 is extended so as to form a gate line (pixel selection line) 111 of the display panel 10 shown in FIG. 4.

Furthermore, the drain electrode 112 is extended to be orthogonal to the gate line 111 so as to form a drain line (data input line) 112.

The gate line 111 and the drain line 112 are connected to a display driver circuit (not shown in the drawings). Moreover, the source electrode 113 is connected to the pixel electrode 114.

The color filter substrate 102, a second substrate, is formed of a transparent substrate such as a glass substrate. Color filters 141 for red (R), green (G), and blue (B), respectively, are formed on the lower surface of the color filter substrate 102 at positions opposite to the pixel electrodes 114. Moreover, the light blocking film 142 is formed so as to surround the color filters 141 for the respective colors. The light blocking film 142 functions as a black matrix.

Moreover, a common electrode 143 formed of a transparent electrode, for example, an indium tin oxide (ITO) film, is formed on surfaces of the color filters 141 which are opposite the pixel electrodes 114. A common voltage with a predetermined voltage level is applied to the common electrode 143.

Furthermore, a polarization plate 131 is provided on the upper surface of the color filter substrate 102. The upper surface of the color filter substrate 102 corresponds to the visual field side. A liquid crystal display pixel serving as an optical element is formed by the above-described pixel electrode 114, common electrode 143, and polarization plates 131 and 132, and liquid crystals sandwiched between the pixel electrodes 114 and the common electrode 143.

Furthermore, the TFT substrate 101 and the color filter substrate 102 are peripherally bonded together by a seal member that seals liquid crystals 103 between the TFT substrate 101 and the color filter substrate 102, though this is not shown in FIG. 1.

In FIG. 4, one subpixel is formed by one pixel TFT-T2 in the display panel 10 which corresponds to each of red (R), green (G), and blue (B) and one pixel electrode 114 connected to the pixel TFT-T2. One display pixel is formed by three subpixels arranged on the color filter substrate 102 adjacent to one another in the row direction of the substrate 102 and corresponding to the colors filters 141 for the three colors, red (R), green (G), and blue (B). The display pixels are two-dimensionally arranged.

Moreover, TFT sensors T0 and TFT sensors T1 are alternately arranged in the row direction in association with the display pixels two-dimensionally arranged as described above. FIG. 4 shows that the TFT sensors are hidden by the light blocking wall 125.

The gate electrode 121 of each of TFT sensor T0 and TFT sensor T1 is formed to have almost the same length as that of one display pixel in the column direction.

Furthermore, a capacitance line 151 is laid on the lower surface of the pixel electrode 114. The capacitance line 151 is supplied with a voltage of the same level as that of the common voltage applied to the common electrode 143. The capacitance line 151 and the pixel electrode 114 form an accumulated capacitance corresponding to each subpixel.

Now, description will be given of the circuit configuration of the display panel 10 according to the present embodiment and a drive circuit built into the display panel 10 to drive the optical sensor of the thin-film-transistor type.

In the present embodiment, the display area of the display panel 10 is divided into plural division areas (optical sensor groups) 11 so that the device can determine the presence or absence of touch of the user's finger or the like for each division area 11. In the display area, the pixel electrodes are arranged.

Figure 5:
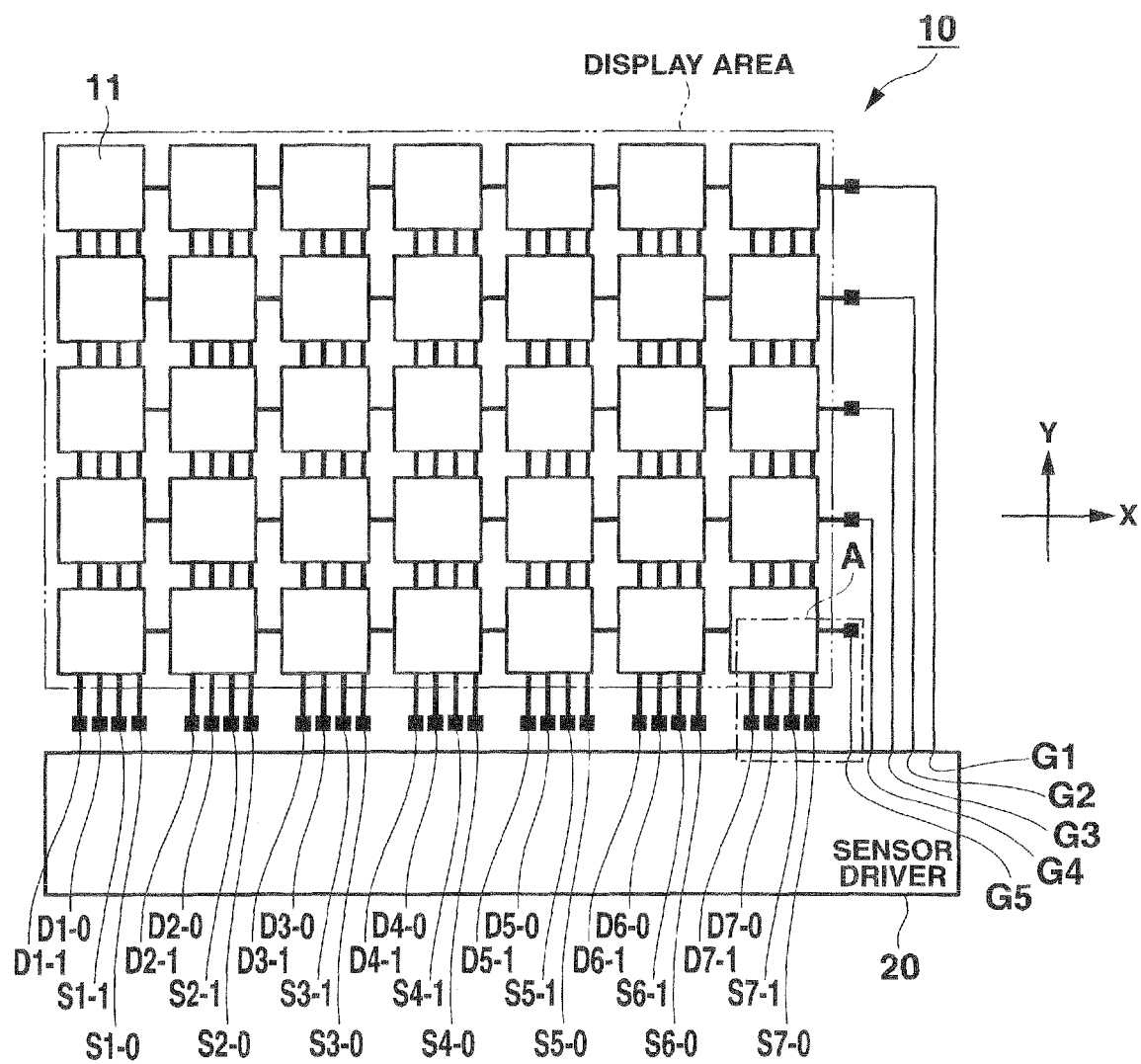
FIG. 5 is a diagram schematically illustrating area division of a display area according to the first embodiment.

FIG. 5 is a diagram schematically showing area division of the display area according to the present embodiment.

FIG. 5 shows an example in which the display area (shown by dashed lines) of the display panel 10 is divided into 7 portions in the row direction and 5 portions in the column direction.

Each of the division areas 11 shown in FIG. 5 is set to be a generally rectangular area that is about 5 mm on each side; the division area has about the same size as that of the user's finger.

Such display pixels as shown in FIG. 4 are arranged in each division area 11. TFT sensor T0 and TFT sensor T1 are arranged adjacent to each display pixel on the respective sides thereof in the row direction. That is, TFT sensor T0 and TFT sensor T1 are alternately arranged via one display pixel. One TFT sensor T0 and one TFT sensor T1 arranged adjacent to each other in the row direction with one display pixel between the sensors T0 form one sensor pair.

In the above-described arrangement of TFT sensor T0 and TFT sensor T1, TFT sensor T0 and TFT sensor T1 in each sensor pair are arranged very close to each other. Thus, both TFT sensors T0 and T1 may be considered to lie at almost the same position. In this case, TFT sensor T0 and TFT sensor T1 in each sensor pair may be considered to have almost the same element temperature.

In the present embodiment, for those of the division areas 11 shown in FIG. 5 which are arranged in the same row (X-direction), the sensor gate lines 121 are joined together into a common sensor gate line 121 connected to the sensor driver 20.

Furthermore, for those of the division areas 11 shown in FIG. 5 which are arranged in the same column (Y-direction), the sensor drain lines 122 and the sensor source lines 123 are joined together into a common drain line 122 and a common source line 123 which are connected to the sensor driver 20.

The sensor gate lines 121, the sensor drain lines 122, and the sensor source lines 123 are preferably joined together into the common sensor gate line 121, the common sensor drain line 122, and the common sensor source line 123, respectively, outside the display area. This is because if the sensor gate lines 121, the sensor drain lines 122, and the sensor source lines 123 are joined together into the common sensor gate line 121, the common sensor drain line 122, and the common sensor source line 123, inside the display area, the interconnects are complicated and images displayed on the display panel 10 may be affected.

As described below, in the present embodiment, the sensor pairs each of TFT sensor T0 and TFT sensor T1 in one division area are simultaneously driven. Thus, TFT sensors T0 and TFT sensors T1 in one division area need not be provided with separate sensor gate lines. Hence, the number of gate terminals (G1 to G5 shown in FIG. 5) in the sensor driver 20 may be the same as that of the rows of the division areas.

In contrast, TFT sensor T0 and TFT sensor T1 need to include the separate sensor drain lines 122.

Thus, the sensor driver 20 need to include drain terminals (D1-0 to D7-0 shown in FIG. 5) for TFT sensors T0 which are the same as the columns of the division areas in number and drain terminals (D1-1 to D7-1 shown in FIG. 5) for TFT sensors T1 which are the same as the columns of the division areas in number.

Moreover, the sensor driver 20 includes source terminals for TFT sensors T0 and separate source terminals for TFT sensors T1.

The drain current output by each division area 11 can be increased by providing the terminals in the sensor driver 20 as described above. This also leads to a reduction in the number of terminals in the sensor driver 20.

Figure 6:
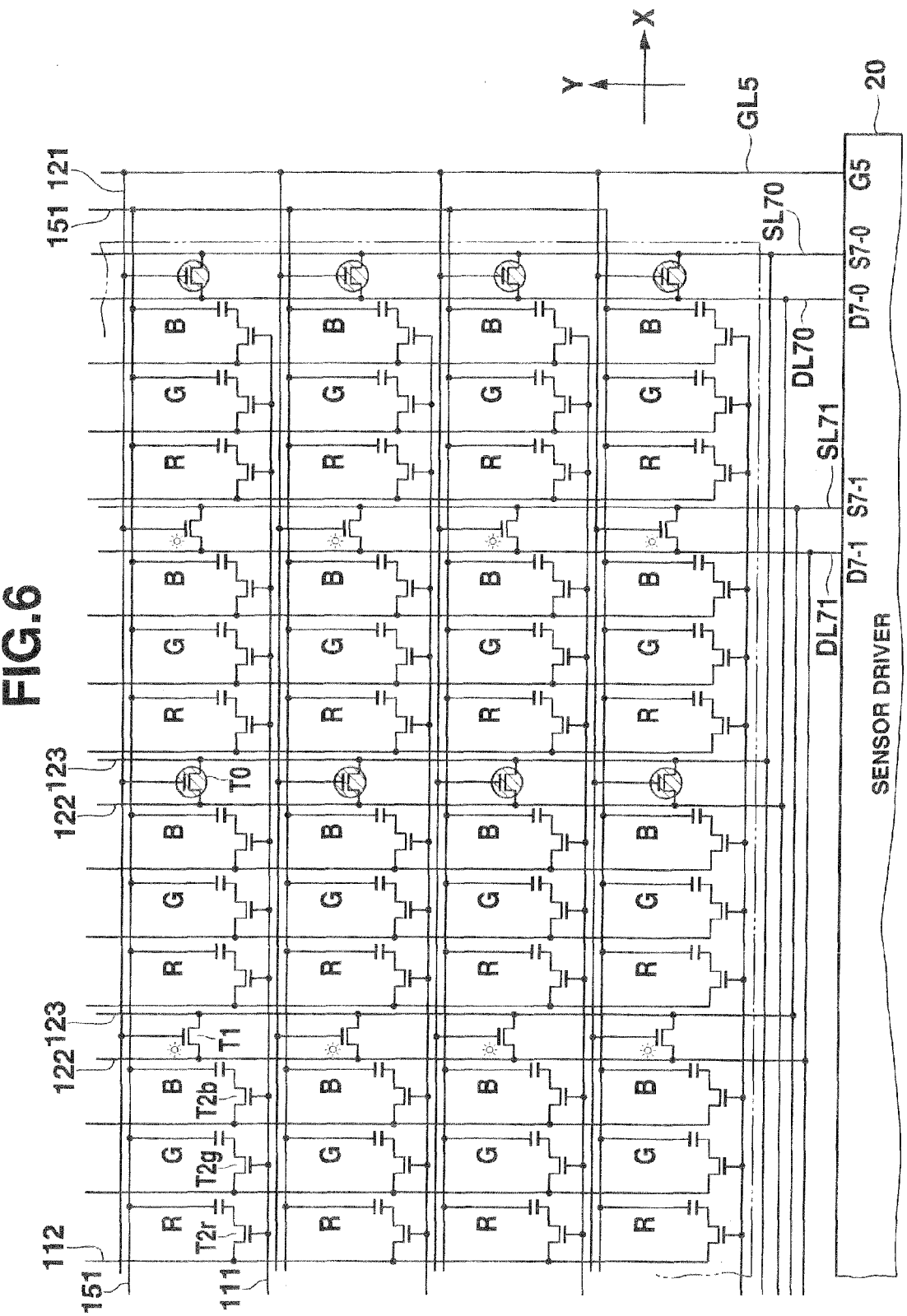
FIG. 6 is a diagram showing a detailed circuit configuration of a part of one division area 11 in a portion A of FIG. 5.

FIG. 6 shows a detailed circuit configuration of a part of one division area which corresponds to a portion A of FIG. 5.

As shown in FIG. 6, TFT sensor T0 and TFT sensor T1 arranged in the same row share one sensor gate line 121. The shared sensor gate lines 121 corresponding to one division area 11 are all connected to a common gate line GL5 outside the display area. The common gate line GL5 is connected to a gate terminal G5 of the sensor driver 20.

Furthermore, TFT sensors T0 arranged in the same column share one sensor drain line 122. Shared sensor drain lines 122 corresponding to one division area 11 are all connected to a common drain line (a first sensor drain line, a common-first-sensor-first-signal-line) DL70 outside the display area. Common drain line DL70 is connected to a drain terminal D7-0 of the sensor driver 20.

Similarly, TFT sensors T1 arranged in the same column share one sensor drain line 122. Common sensor drain lines 122 corresponding to one division area 11 are all connected to a common drain line (a first sensor drain line, a common-second-sensor-first-signal-line) DL71 outside the display area. Common drain line DL71 is connected to a drain terminal D7-1 of the sensor driver 20.

Additionally, TFT sensors T0 arranged in the same column share one sensor source line 123. Shared sensor source lines 123 corresponding to one division area 11 are all connected to a common source line (a first sensor source line, a common-first-sensor-second-signal-line) SL70 outside the display area. The common source line SL70 is connected to a source terminal S7-0 of the sensor driver 20.

Moreover, TFT sensors T1 arranged in the same column share one sensor source line 123. Common sensor source lines 123 corresponding to one division area 11 are all connected to a common source line (a second sensor source line, a common-second-sensor-second-signal-line) SL71 outside the display area. The common source line SL71 is connected to a source terminal S7-1 of the sensor driver 20.

Figure 7:
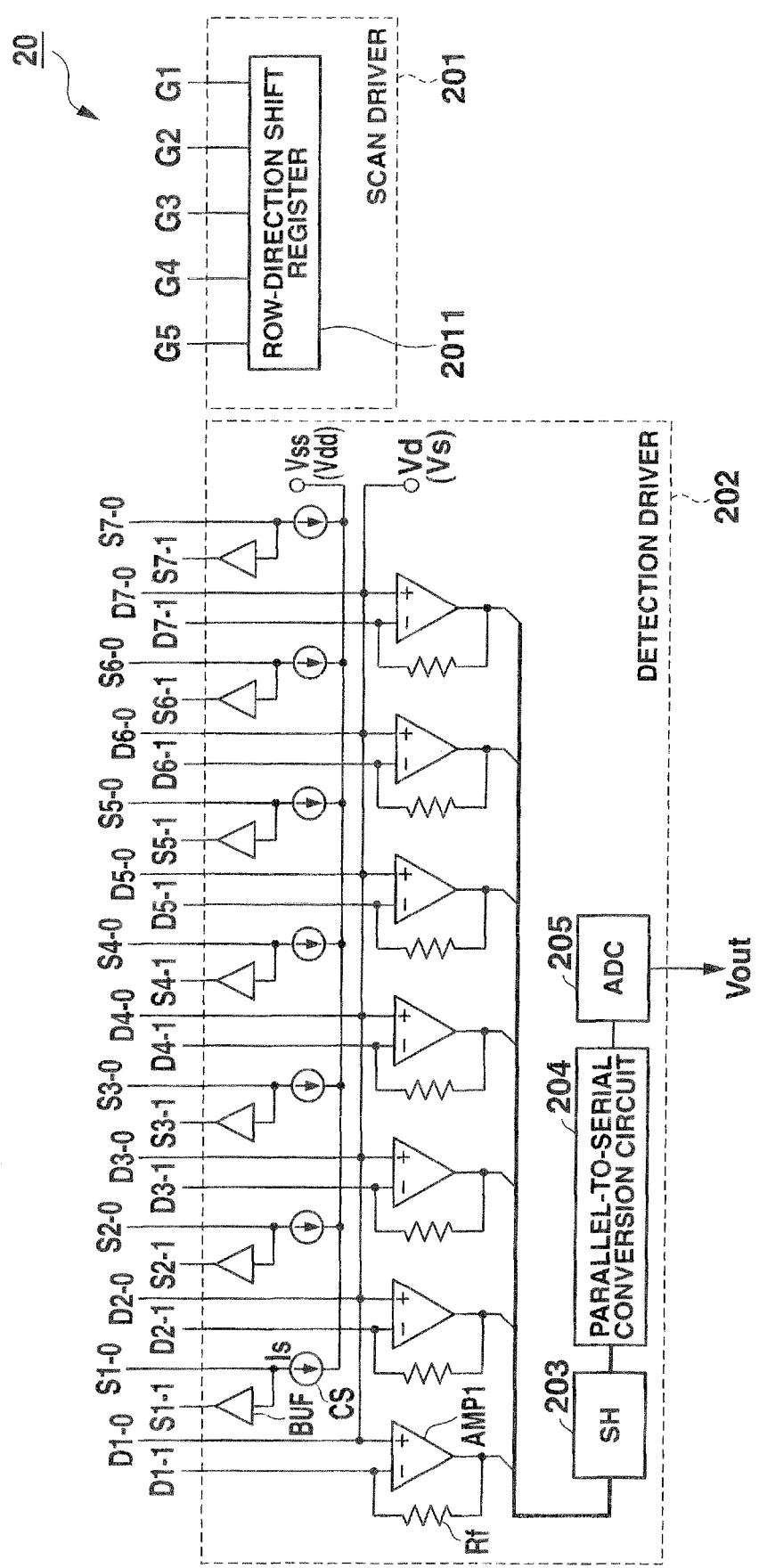
FIG. 7 is a circuit diagram showing an example of circuit configuration of a sensor driver.

FIG. 7 is a circuit diagram showing an example of a circuit configuration of the sensor driver 20.

The sensor driver 20 includes a scan driver 201 and a detection driver 202.

The scan driver 201 sequentially outputs sensor scan signals through gate terminals G1 to G5 to sequentially set the pair of TFT sensor T0 and TFT sensor T1 connected to each gate terminal Gn to a selected state, for each row. In the selected state, TFT sensor T0 and TFT sensor T1 are turned on.

The detection driver 202 converts a photocurrent signal (drain current) output by TFT sensor T1 set to the selected state, into a voltage signal. The detection driver 202 acquires voltage signals based on the respective TFT sensors T1, in parallel to sequentially output digital signal outputs Vout corresponding to the respective voltage signals as detection signals.

The scan driver 201 includes a row-direction shift register 2011 serving as a row-direction drive section.

The row-direction shift register 2011 includes gate terminals the number of which is the same as that of common gate lines GLn in the display panel 10 in number (in the example illustrated in FIG. 7, the number is 5). The row-direction shift register 2011 sets TFT sensors T0 and T1 in each division area 11 to the selected state; TFT sensors T0 and T1 are connected together via each common gate line GLn and the sensor gate line 121.

The detection driver 202 according to the present embodiment includes drain terminals and source terminals (in the example illustrated in FIG. 7, the number of drain terminals (7×2=14)+the number of source terminals (7×2=14)=28) the numbers of which are the same as those of common drain lines Dim and common source lines SLm, respectively.

Drain terminals Dm-0 (m=1, 2, . . . , 7. The drain terminals correspond to those shown in FIG. 5) connected to the drain electrodes of TFT sensors T0 are connected to non-inverting input terminals of respective operational amplifiers AMP1. A voltage source configured to provide a voltage Vd is connected to the non-inverting terminals.

Furthermore, drain terminals Dm-1 (m=1, 2, . . . , 7) connected to the drain electrodes of TFT sensors T1 are connected to inverting input terminals of the respective operational amplifiers AMP1.

Additionally, a resistor Rf is connected between the inverting input terminal and an output terminal of each of the operational amplifiers AMP1. The operational amplifier AMP1 and the resistor Rf form a current-to-voltage conversion circuit.

In addition, source terminals Sm–0 (m=1, 2, ..., 7) connected to respective common source lines SLm0 (m=1, 2, ..., 7) are each connected to one end of a current source CS. The other end of the current source CS is connected to a voltage source configured to provide a potential Vss (Vss<Vd).

The current source CS is of a current intake type and allows a current Is to flow in an intake direction from the source terminal Sm–0 connected to the one end of the current source to the voltage source Vss connected to the other end of the current source.

Moreover, source terminals Sm–1 (m=1, 2, 7) connected to respective common source lines SLm1 (m=1, 2, ..., 7) are each connected to the one end of the current source CS via a buffer circuit BUF.

Furthermore, output terminals of the operational amplifiers AMP1 are all connected to a sample-and-hold (SH) circuit 203.

The sample-and-hold (SH) circuit 203 loads output voltages (voltage signals) from the operational amplifiers AMP1 corresponding to the respective drain terminals Dm–1 (m=1, 2, ..., 7), in parallel as parallel signals.

The SH circuit 203 is connected to a parallel-to-serial conversion circuit 204 connected to an analog-to-digital conversion circuit (ADC) 205.

The parallel-to-serial conversion circuit 204 converts the output voltages from the operational amplifiers AMP1, that is, the parallel signals loaded by the sample-and-hold (SH) circuit 203, into a serial signal in accordance with a control signal. The parallel-to-serial conversion circuit 204 then supplies the serial signal to the analog-to-digital conversion circuit (ADC) 205.

The analog-to-digital conversion circuit (ADC) 205 converts the serial signal supplied by the parallel-to-serial conversion circuit 204 into a digital signal, and outputs a digital signal output Vout.

Now, the operation of the liquid crystal display apparatus shown in FIG. 1 to FIG. 7 will be described.

First, a display operation of the liquid crystal display apparatus will be described.

The display operation of the liquid crystal display apparatus is no different from that of the conventional liquid crystal display apparatus, and will thus be described in brief.

To display images for one screen, a display driver circuit (not shown in the drawings), for example, sequentially feeds a high-level scan signal through the gate lines 111 shown in FIG. 4 starting with the top gate line. The display driver circuit also supplies each of the drain lines 112 with grayscale level signals corresponding to the grayscale levels of images to be displayed by the corresponding subpixels.

When the scan signal becomes high in level, the pixels TFT-T2 in one row connected to the gate line 111 on which the scan signal has become high in level are all turned on. The subpixels in this row are placed in the selected state.

When the pixel TFT-T2 is turned on, a grayscale level signal supplied to the drain line 112 via this pixel TFT-T2 is applied to the pixel electrode 114.

At this time, the application of the grayscale level signal allows the difference between a pixel electrode voltage generated at the pixel electrode 114 and the common voltage applied to the common electrode to be applied to the liquid crystal 103. Thus, an image is displayed on the corresponding subpixel.

Furthermore, the voltage applied to the liquid crystal 103 is held in an accumulated capacitance formed by the capacitance line 151 and the pixel electrode 114.

Now, the operation of a touch sensor using TFT sensors T0 and T1 will be described below.

Figure 8:
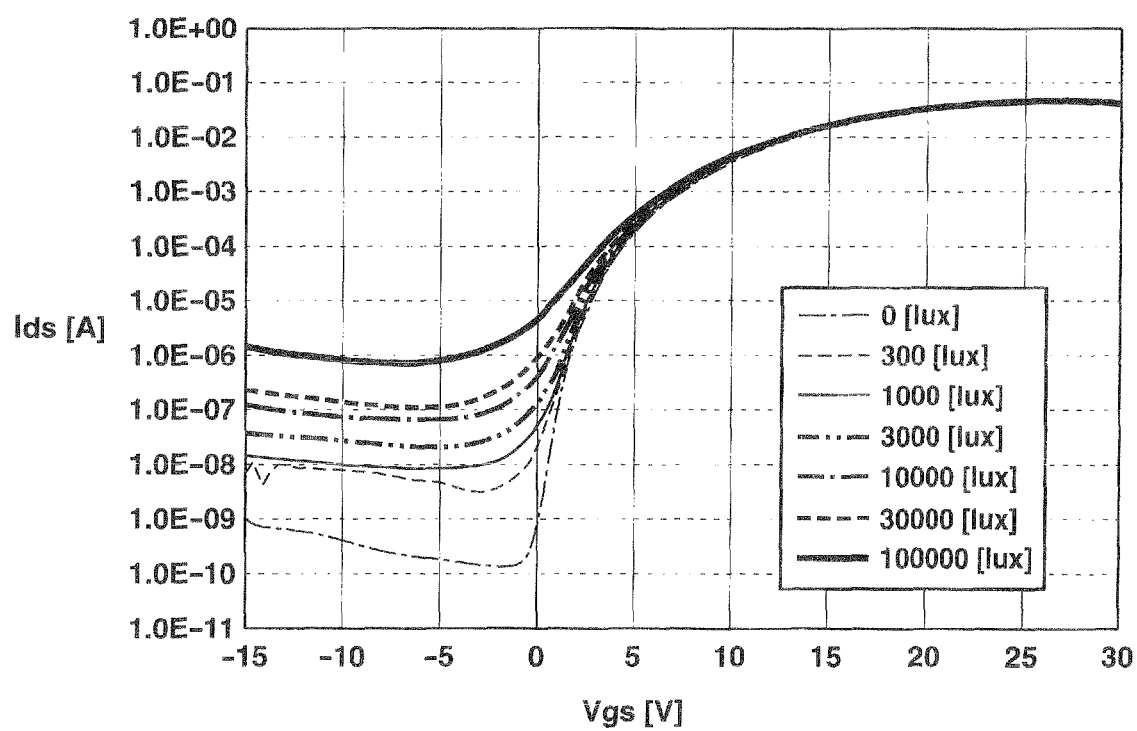
FIG. 8 is a diagram illustrating the photoelectric current-voltage characteristics of a-Si TFTs.

FIG. 8 is a diagram showing the photoelectric current-voltage characteristics of a-Si TFTs.

In an initial state, the row-direction shift register 2011 applies no voltage. In this state, all the TFT sensors in the display area are in an unselected state. Thus, the drain current corresponding to the selected state is prevented from flowing through each TFT sensor.

For a-Si TFTs, in actuality, even when the TFT sensors are in the unselected state (for example, Vgs=0), a certain amount of drain current flows through each TFT sensor, as indicated by the photoelectric current-voltage characteristics illustrated in FIG. 8. However, the drain current in the unselected state is much smaller than that in the selected state (for example, Vgs=3 to 5 V).

Then, in the initial state in which all the TFT sensors are in the unselected state, the row-direction shift register 2011 first sets the voltage of the gate terminal G1 corresponding to the division areas 11 in the first row shown in FIG. 5 equal to an on-level voltage for TFT sensors T0 and T1, in order to place TFT sensors T0 and T1 connected to the gate terminal G1 in the selected state.

On the other hand, the row-direction shift register 2011 sets the voltages of the gate terminals G2 to G5 equal to an off-level voltage for TFT sensors T0 and T1.

When all TFT sensors T0 and T1 contained in the division areas 11 in the first row connected to the gate terminal G1 are set to the selected state by the row-direction shift register 2011, each of TFT sensors T0 and T1 outputs a drain current corresponding to the selected state or the state in which the user's finger or the like is touching any of the division areas. Thus, the device can determine whether or not the user's finger or the like is touching any of the division areas 11 in the first row.

More specifically, an imaginary short-circuiting action of the operational amplifier AMP1 makes the drain voltage of TFT sensor T0 equal to that of TFT sensor T1. Here, the voltage source Vd fixes the drain voltage of TFT sensor T0 to a given magnitude Vd. Thus, the drain voltage of TFT sensor T1 is also Vd. The specific magnitude of Vd is not particularly limited, but for example, Vd=0.

Furthermore, the current Is supplied by the current source CS and having a given magnitude flows from TFT sensor T0 toward a voltage source Vss as the drain current of TFT sensor T0.

Since the drain current Is of the given magnitude flows from TFT sensor T0 and the drain and gate voltages of TFT sensor T0 are constant, the source voltage of TFT sensor T0 floats.

Furthermore, the buffer circuit BUF makes the source voltage of TFT sensor T0 equal to that of TFT sensor T1.

Thus, each of the electrodes of TFT sensor T0 has a voltage equal to that of the corresponding one of the electrodes of TFT sensor T1.

In this state, if light from the backlight 104 or external light does not enter the photoelectric conversion section 124 of TFT sensor T1, that is, the user's finger or the like is touching any of the division areas 11 in the first row, the drain current Ids0 through TFT sensor T1 as a dark current has the same magnitude as that of the dark current Is through TFT sensor T0. This relationship is established when TFT sensor T0 and TFT sensor T1 are the same in size. If TFT sensor T0 and TFT sensor T1 are different in size, the drain current Ids0 through TFT sensor T1 as a dark current is expressed by Ids0=Is×(S1/S0). Here, reference number S1 denotes a value obtained by dividing the channel width of TFT sensor T1 by the channel length of TFT sensor T1. Reference number S0 denotes a value obtained by dividing the channel width of TFT sensor T0 by the channel length of TFT sensor T0.

On the other hand, if light from the backlight 104 or external light enters the photoelectric conversion section 124 of TFT sensor T1, that is, the user's finger or the like is not touching any of the division areas 11 in the first row, the drain current through TFT sensor T1 increases consistently with the illuminance of the incident light. If the increase is denoted by ΔIds, the drain current obtained when the light is incident is expressed by Ids=Ids0+ΔIds.

Thus, drain currents Ids output by the respective division areas 11 in the first row are converted into voltages in parallel by the respective current-to-voltage conversion circuits each comprising the operational amplifier AMP1 and the resistor Rf. When the resistance of the resistor Rf is denoted by RF, the output voltage from each operational amplifier AMP1 is −Ids×RF (Vd=0).

As described above, the output from the respective operational amplifiers AMP1 are held by the SH circuit 203 in parallel as parallel signals.

The output voltages held by the SH circuit 203 are converted into a serial signal by the parallel-to-serial conversion circuit 204. The serial signal is then input to ADC 205.

The voltage converted into the serial signal is sequentially input to ADC 205 and then converted into a digital signal. The digital signal output Vout is input to a control circuit (not shown in the drawings) of the touch sensor.

The control circuit of the touch sensor determines in which column the division area 11 in the first row corresponding to the magnitude of the digital signal output Vout is present and whether the magnitude of the digital signal output Vout corresponds to Ids or Ids0. The control circuit thus determines whether or not the division area 11 in each column in the first row has been touched by the user's finger or the like.

After the determination of whether or not the division area 11 in each column in the first row has been touched by the user's finger or the like has finished, the row-direction shift register 2011 sets the voltage of the gate terminal G2 equal to the on-level voltage for TFT sensors T0 and T1 so that TFT sensors T0 and T1 connected to the gate terminal G2 corresponding to the division areas 11 in the second row are placed in the selected state. On the other hand, the row-direction shift register 2011 sets the voltage of the gate terminals G1 and G3 to G5 equal to the off-level voltage for TFT sensors T0 and T1.

As is the case with the first row, after the determination of whether or not each division area 11 in one row has been touched by the user's finger or the like has finished, the row-direction shift register 2011 sets the voltage of the gate terminal corresponding to the division areas 11 in the next row equal to the on-level voltage for TFT sensors T0 and T1.

The above-described operation is performed on each of the division areas 11 in all the rows to determine the presence or absence of touch of the user's finger or the like for the entire display area.

Now, advantages of the present embodiment will be described.

As described above, for the two-dimensionally arranged TFT sensors T0 and T1, the present embodiment selects TFT sensors T0 and T1 by the row of the division areas 11, while acquiring the voltage signal corresponding to the drain currents from TFT sensors T1 in each division area 11.

The drain current from thin-film transistor varies depending not only on the illuminance of incident light on the photoelectric conversion section including a semiconductor layer but also on temporal changes or temperature changes. However, for the drain current from TFT sensor T1, the present embodiment can set the drain current Ids0 flowing as a dark current to be equal to the current is supplied by the current source CS.

As described above, in one sensor pair, TFT sensor T0 and TFT sensor T1 are arranged very close to each other. Thus, TFT sensor T0 and TFT sensor T1 may be considered to be under the same temperature condition. Hence, the adverse effect of a temporal change or a temperature change in TFT sensor T0 or TFT sensor T1 may vary the drain voltage of the TFT sensor.

Thus, the drain current Ids through TFT sensor T1 depends only on the illuminance. This enables voltage signals to be acquired for which the adverse effects of temporal changes or temperature changes in TFT sensor T0 or TFT sensor T1 are controlled.

Moreover, in the present embodiment, when any of the division areas is touched by the user's finger or the like, the drain current through TFT sensor T1 is equal to Ids0. This magnitude is not affected by the intensity of light from the backlight 104 or external light. Thus, the presence or absence of touch of the user's finger or the like can be stably determined without being affected by changes in light from the backlight 104 or external light.

Furthermore, in the present embodiment, the row-direction shift register 2011 of the scan driver 201 simultaneously sets TFT sensors T0 and T1 in one row in the division area 11. Thus, the operational amplifier AMP1 outputs the output voltages (voltage signals) corresponding to the drain currents as parallel signals. In the present embodiment, the serial signal resulting from the parallel signals is acquired to enable signals from the TFT sensors to be acquired based on line-sequential driving. Thus, compared to, for example, a configuration in which the presence or absence of touch of the user's finger or the like is sequentially determined for each sensor, the present embodiment enables a reduction in time required to determine the presence or absence of touch of the user's finger or the like, for the entire display area.

Furthermore, if the optical sensor device according to the present embodiment is used as a touch sensor for determining the presence or absence of touch of the user's finger or the like, the determination need not be made for each micro area such as each display pixel. For example, the presence or absence of touch of the user's finger or the like may often be determined for each area larger than one pixel, for example, an area that is about several mm on each side. Thus, the optical sensor device may be appropriately used as a touch sensor for determining the presence or absence of touch of the user's finger or the like, by dividing the display area into division areas 11 each with display pixels.

In this case, one sensor gate line 121, one sensor drain line 122, and one sensor source line 123 are shared for each row of the division areas 11. This leads to a reduction in the number of terminals in the sensor driver 20.

Furthermore, the drain currents are collectively led out for each division area 11 to enable a large drain current to be led out without the need to amplify the drain current. This enables a reduction in the possibility of erroneously determining the presence or absence of touch.

Moreover, in the present embodiment, TFT sensors T0 and T1 arranged in the same row share one sensor gate line 121. TFT sensors T0 and T1 arranged in the same column share one common sensor drain line 122 and one sensor source line 123. This configuration enables the numbers of the sensor gate lines 121, the sensor drain lines 122, and the sensor source lines 123 to be limited to the minimum required.

Furthermore, the present embodiment provides a configuration suitable for an optical sensor device comprising two-dimensionally arranged optical sensor devices using a-Si TFTs.

That is, the photoelectric current-voltage characteristics of a-Si TFTs illustrated in FIG. 8 indicate that in an optical sensor of the thin-film-transistor type using an a-Si TFT, the rate of change in drain current with respect to the illuminance obtained when the gate voltage of the thin-film transistor is set to be negative is greater than that with respect to the illuminance obtained when the gate voltage of the thin-film transistor is set to be positive. Thus, if the thin-film transistor is used as an optical sensor of the thin-film-transistor type, the optical sensor of the thin-film-transistor type is normally driven with a negative gate voltage applied to the thin-film transistor.

If such an optical sensor is used alone, the optical sensor may be driven with a negative gate voltage applied to the thin-film transistor without any problem. However, the present embodiment two-dimensionally arranges optical sensors so as to allow each of the optical sensors to determine the presence or absence of touch of the user's finger or the like, and intends to minimize the number of wires required for the optical sensors. In this case, the above-described configuration in which the gate voltage of the thin-film transistor is set to be negative is disadvantageous as described below.

That is, in the present embodiment, thin-film transistors in the same column are connected to the common sensor drain line 122 in order to reduce the wires required for the optical sensors. In this case, when the semiconductor device is configured such that to be selected, the thin-film transistor is provided with a negative gate voltage so as to be used as an optical sensor of the thin-film-transistor type, whereas to be unselected, the thin-film transistor is provided with a zero gate voltage, the drain current through the thin-film transistor when the negative gate voltage is applied to the thin-film transistor is not significantly changed depending on the absolute value of the negative gate voltage as shown in FIG. 8. Thus, very small drain currents of similar magnitudes constantly flow from all thin-film transistors belonging to the same column regardless of whether thin-film transistors are selected or unselected. As a result, determining the presence or absence of touch for each row of optical sensors is difficult.

In contrast, in the present embodiment, to be selected, the thin-film transistor is provided with a positive gate electrode (Vgs=3 to 5 V), whereas to be unselected, the thin-film transistor is provided with a zero gate voltage. In this case, the change in the drain current through the thin-film transistor when the gate voltage of the thin-film transistor is made positive is greater than the change in the drain current through the thin-film transistor when the gate voltage of the thin-film transistor is made negative. That is, the drain current through the thin-film transistor in the selected state is definitely different from that through the thin-film transistor in the unselected state. Thus, determining the presence or absence of touch for each row of division areas is possible.

However, applying a positive gate voltage to the thin-film transistor to allow the thin-film transistor to be used may result in more serious adverse effects of temporal changes or temperature changes as described above. However, according to the present embodiment, the above-described configuration allows the adverse effects of temporal changes or temperature changes to be suppressed. Hence, the present embodiment allows a reduction in the number of wires, while enabling determination of the presence or absence of touch for each row of the division areas 11.

Furthermore, according to the present embodiment, if the pixel TFT-T2 forming the display pixel is formed of an a-Si TFT, the pixel TFT-T2 can be manufactured during the same process as that in which TFT sensors T0 and T1 forming the optical sensor device are manufactured. This enables a reduction in manufacturing costs.

Moreover, with the light blocking wall 126 provided so as to surround the photoelectric conversion section 124 of TFT sensor T1, the photoelectric conversion section 124 of TFT sensor T1 can be completely blocked from light when the user's finger or the like comes into touch with any of the division areas 11.

Moreover, since the TFT sensor can be completely covered with the light blocking film 142, the periodic structures other than the display pixels can be prevented from being viewed during observation of the display panel 10.

In the above-described embodiment, the light blocking wall 126 is provided on the TFT substrate 101. However, in fact, the light blocking wall 126 has only to allow incidence of light on the photocurrent conversion section 124 of TFT sensor T1 to be blocked when the user's finger or the like comes into touch with the color filter substrate 102. Thus, the present embodiment is not limited to the configuration in which light blocking wall 126 is provided on the TFT substrate 101.

Figure 9:
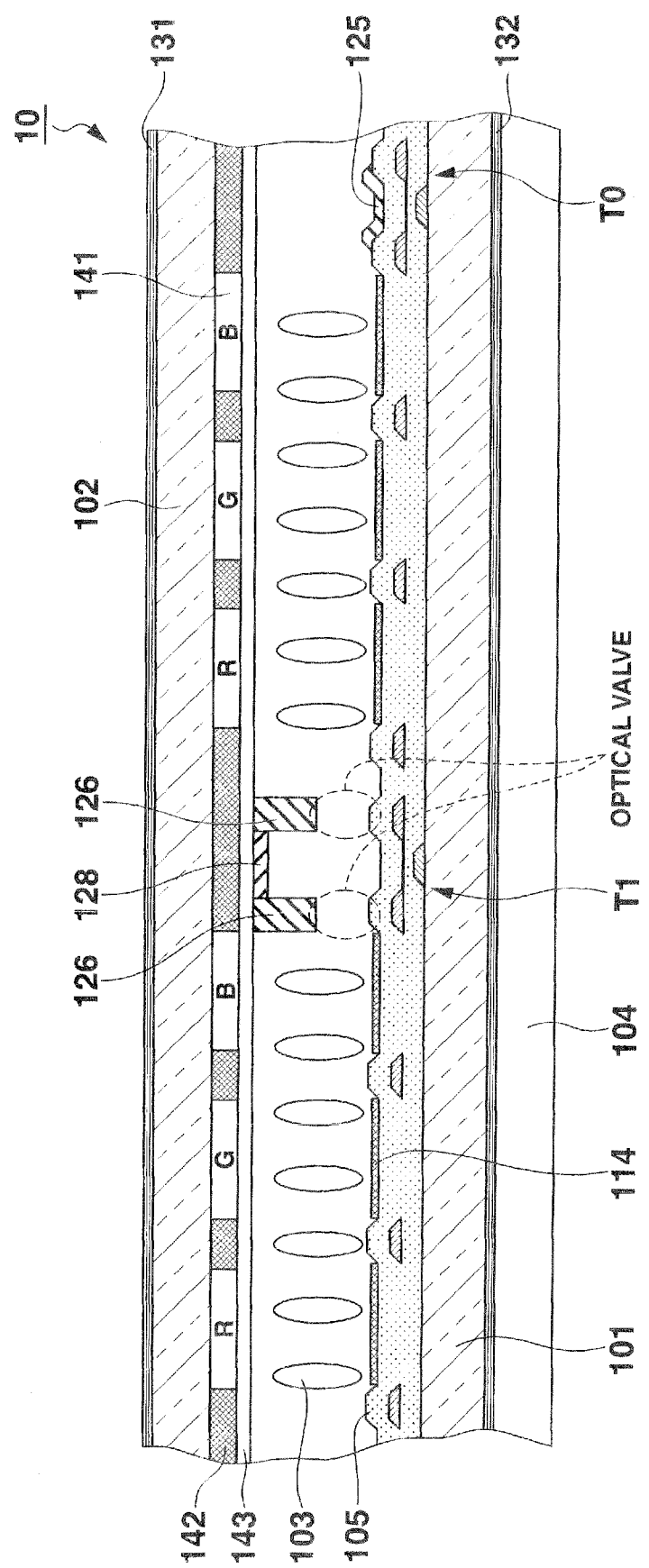
FIG. 9 is a diagram showing a modification of a light blocking wall.

FIG. 9 is a diagram showing a modification of the light blocking wall.

For example, as shown in FIG. 9, the light blocking wall 126 may be provided on the color filter substrate 102 corresponding to a position where the light blocking wall 102 surrounds the photoelectric conversion section 124 of TFT sensor T1. In this case, as shown in FIG. 9, the optical valve is formed in the gap between the lower end of the light blocking wall 126 and the TFT substrate 101.

Furthermore, FIG. 1 shows that the light blocking wall 125 has a sufficient film thickness. However, if for example, a metal material with a relatively high light blocking capability is used as the light blocking wall 125, the light blocking wall 125 may have a relatively small film thickness as shown in FIG. 9.

Furthermore, the circuit configuration of the sensor driver 20 shown in FIG. 7 is illustrative and appropriately modifiable. For example, in the detection driver 202 shown in FIG. 7, the current source CS is of the current intake type. However, the present embodiment is not limited to this type.

Figure 10:
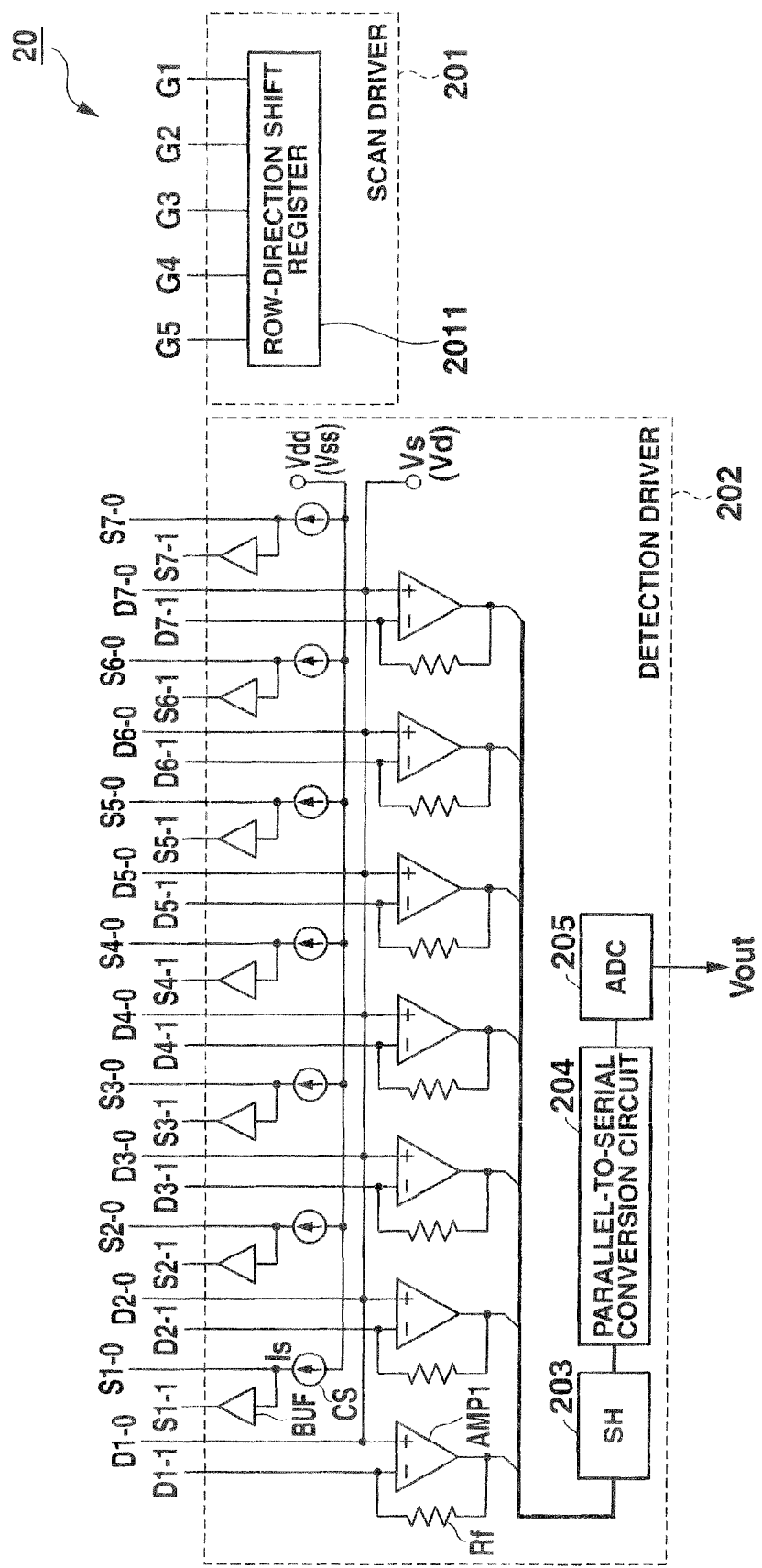
FIG. 10 is a circuit diagram showing a modification of the sensor driver according to the first embodiment.

FIG. 10 is a circuit diagram showing a modification of the sensor driver 20 according to the present embodiment.

That is, as shown in FIG. 10, the current source CS may be of the current discharge type that feeds the current Is toward the source terminal Sm–0. This configuration exerts effects similar to those of the configuration shown in FIG. 7 described above.

If the current source is of the discharge type, the circuit configuration shown in FIG. 7 is modified such that the other end of the current source CS is connected to a voltage source configured to provide a voltage Vdd and such that the drain terminal Dm–0 for TFT sensor T0 is connected to a voltage source configured to provide a voltage Vs (Vs<Vdd), as shown in FIG. 10.

In the example illustrated in the above-described embodiment, the touch sensors based on the optical sensors of the thin-film-transistor type are built into the liquid crystal display apparatus. However, the technique according to the embodiment is not limited to the configuration with the touch sensors built into the liquid crystal display apparatus but applicable to other, flat panel display apparatuses. The technique according to the present embodiment is applicable to, for example, organic electroluminescent display apparatuses.

Figure 11:
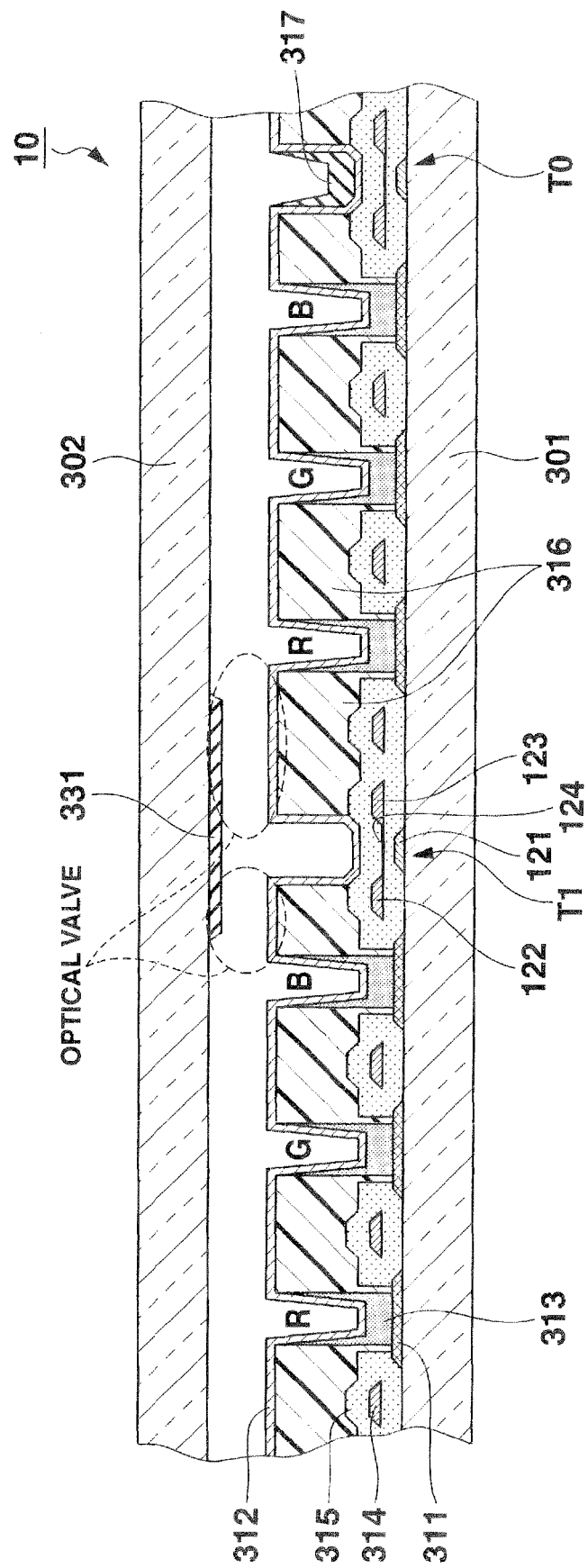
FIG. 11 is a diagram showing a cross-sectional structure of a display panel comprising the optical sensor device according to the first embodiment of the invention and forming an organic electroluminescent display apparatus.

FIG. 11 is a diagram showing the sectional structure of the display panel 10 comprising the optical sensor device according to the first embodiment of the invention and forming an organic EL display apparatus; the diagram is taken at a cut position equivalent to that for FIG. 1 described above.

Figure 12:
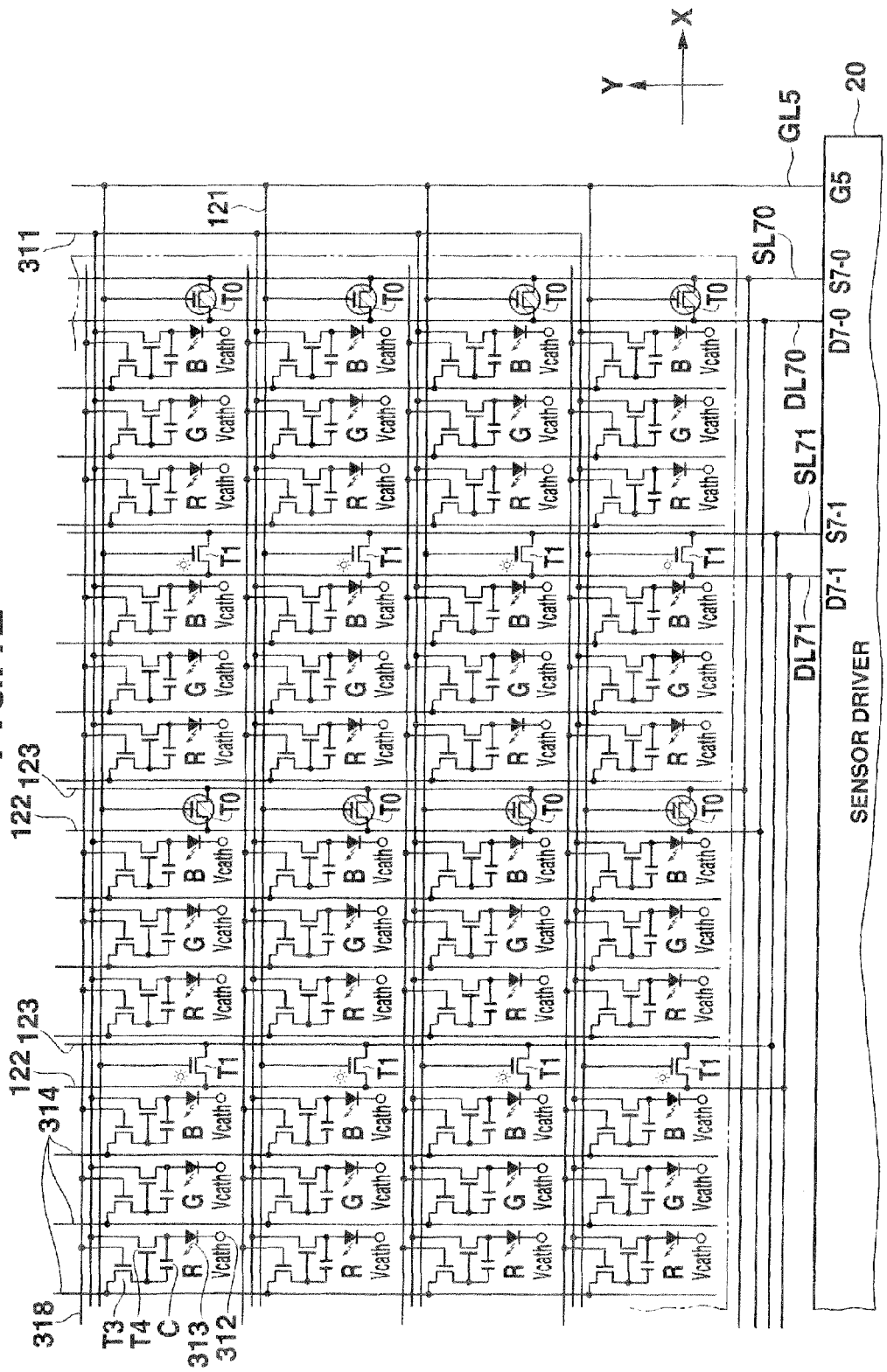
FIG. 12 is a diagram showing a detailed circuit configuration of a part of one division area in the display panel shown in FIG. 11.

FIG. 12 is a diagram showing a detailed circuit configuration of a part of one division area in the display panel 10 shown in FIG. 11 which part corresponds to the part A of FIG. 5 described above.

In FIG. 11, the display panel 10 forming the organic electroluminescent display apparatus comprises a glass substrate 301 and a sealing glass substrate 302. The space between the glass substrate 301 and the sealing glass substrate 302 is sealed by a seal member (not shown in the drawings) so as to set a predetermined distance between the glass substrate 301 and the sealing glass substrate 302.

Anode electrodes 311 of organic electroluminescent elements corresponding to subpixels in the respective colors are formed on the upper surface of the glass substrate 301.

An organic electroluminescent light emission layer 313 including, for example, an electron transport layer and a hole transport layer is formed on each of the anode terminals 311. Moreover, a cathode electrode 312 formed of, for example, ITO is provided on the organic electroluminescent light emission layer 313.

Furthermore, the subpixels including the organic electroluminescent display elements as optical elements and corresponding to the respective colors R, G, and B are insulated by, for example, insulating layers 315.

Moreover, a transistor T3 shown in FIG. 12 (only a drain electrode 314 of transistor T3 is shown in FIG. 11) and TFT sensors T0 and T1 are provided in each of the insulating layers 35.

The drain electrode 314 of transistor T3 extends in the column direction of the display panel so as to serve also as a data line (data input line).

Additionally, a source electrode of transistor T3 is connected to the organic electroluminescent display element via a transistor T4 and a capacitance C.

Moreover, a gate electrode of transistor T3 extends in the row direction of the display panel so as to serve also as a select line (pixel select line) 318.

Furthermore, light blocking walls 316 are formed on the insulating layer 315 to partition the subpixels corresponding to the colors R, G, and B from one another.

In order to block light from entering the photoelectric conversion section of TFT sensor T0, light blocking ink 317 formed of, for example, a polymer material with a high light blocking effect is applied to the area between the light blocking walls 316 by, for example, a nozzle coat method. The polymer material with the high light blocking effect contains no water.

FIG. 11 shows that the light blocking wall 316 is larger than the organic electroluminescent display element. However, this illustration is for convenience, and in actuality, the organic electroluminescent display element is larger than the light blocking wall 316.

Furthermore, a reflection film 331 such as an aluminum thin film which is configured to allow light to enter TFT sensor T1 is formed on the lower surface of the sealing glass substrate 302 opposite TFT sensor T1. The light blocking wall 316 has a height determined such that a predetermined gap (optical valve) is formed between the light blocking wall 316 and the reflection film 331 on the sealing glass substrate 302. The height corresponds to the length of the light blocking wall 316 in the direction perpendicular to the planar direction of the upper surface of the glass substrate 301.

In this configuration, the optical valve in TFT sensor T1 is open while the sealing glass substrate 302 is not pressed by the user's finger or the like. In this state, the photoelectric conversion section of TFT sensor T1 is exposed. Thus, light emitted by the organic electroluminescent display pixel located close to TFT sensor T1 or light from the outside of the display panel 10 enters the photoelectric conversion section of TFT sensor T1.

On the other hand, if the user's finger or the like applies downward pressure to the sealing glass substrate 302, the sealing glass substrate 302 is partly flexed and deformed to close the optical valve. In this state, light is blocked from entering the photoelectric conversion section of TFT sensor T1.

The circuit configuration shown in FIG. 12 corresponds to the circuit configuration shown in FIG. 6 in which the pixel TFT-T2 and liquid crystal display element forming each subpixel are replaced with a pixel comprising transistors T3 and T4, the capacitance C, and the organic electroluminescent display element. TFT sensors T0 and T1 have a circuit configuration equivalent to that shown in FIG. 6. Thus, an applicable drive circuit for driving TFT sensors T0 and T1 may be configured equivalently to the sensor driver 20 shown in FIG. 7 or FIG. 10.

Even such an organic electroluminescent display apparatus as illustrated above can exert effects similar to those of the above-described liquid crystal display apparatus by connecting TFT sensors T0 and T1 to the sensor driver 20 as shown in FIG. 12.

<Second Embodiment>

Now, a second embodiment of the invention will be described.

Figure 13:
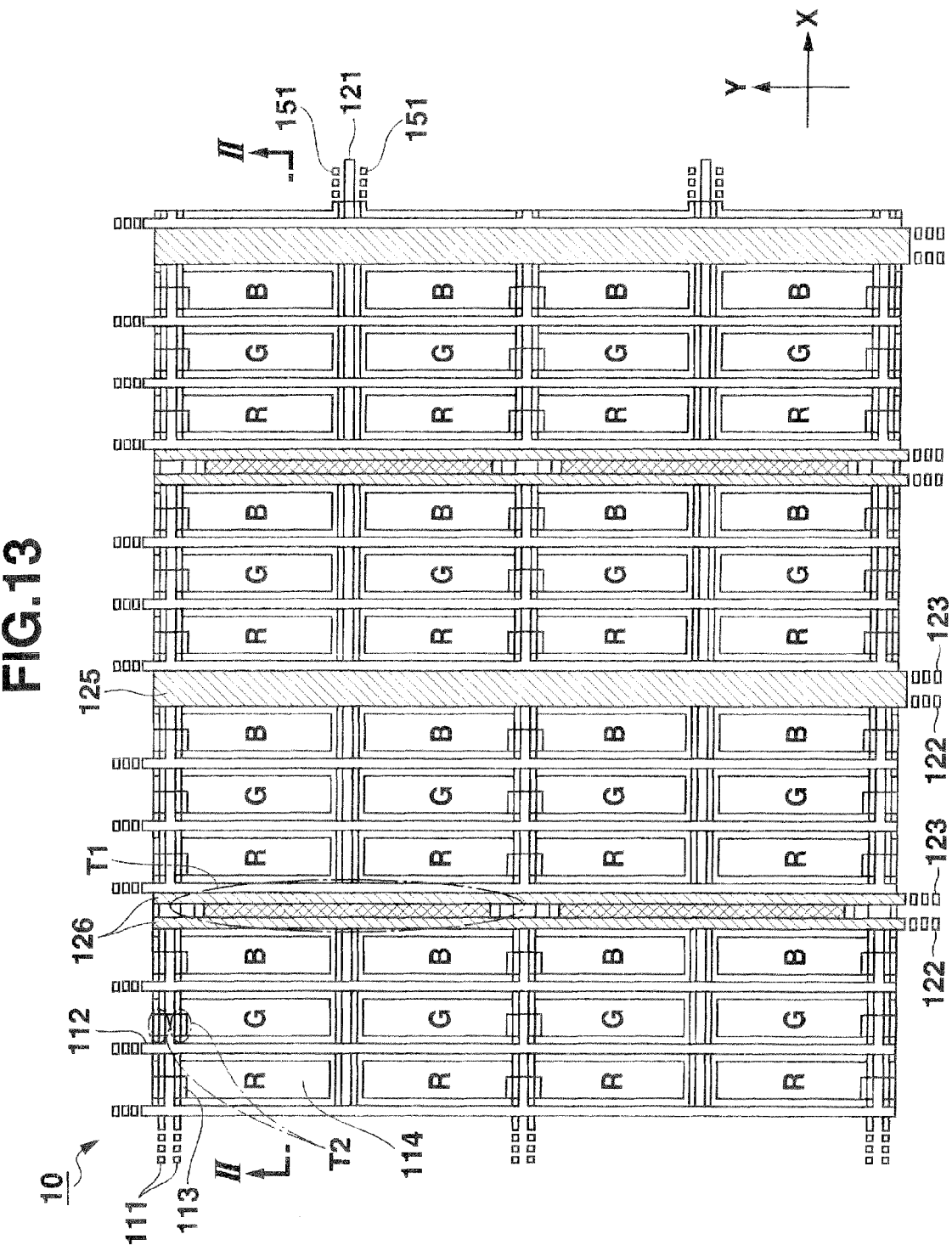
FIG. 13 is a front view of a display panel comprising an optical sensor device according to a second embodiment of the invention.

FIG. 13 is a front view showing an example of a display panel 10 comprising an optical sensor device according to a second embodiment of the invention.

The display panel 10 shown in FIG. 13 forms a liquid crystal display apparatus with built-in optical sensors of the thin-film-transistor type. Components of the display panel 10 which are equivalent to those shown in FIG. 4 are denoted by the same reference numbers. Description of these components is omitted or simplified.

Like the display panel 10 according to the first embodiment, the display panel 10 according to the present embodiment comprises display pixels including three subpixels corresponding to color filters 141 for the three colors, red (R), green (G), and blue (B). The display pixels are two-dimensionally arranged.

The optical sensor device according to the present embodiment includes optical sensors of the thin-film-transistor type comprising TFT sensors T0 and T1. However, the optical sensor device according to the present embodiment is different from that according to the first embodiment in the size of TFT sensors T0 and T1 in the column direction and in the number of TFT sensors T0 and T1 disposed on the display panel 10. Furthermore, the optical sensor device according to the present embodiment is different from that according to the first embodiment in the arrangement of sensor gate lines 121.

Gate lines 111 and sensor gate lines 121 are disposed along the row direction (X-direction shown in FIG. 13) of a TFT substrate 101. Drain lines 112, Sensor drain lines 122, and Sensor source lines 123 are disposed along the column direction (Y-direction shown in FIG. 13) of the TFT substrate 101.

The sectional structure of the display panel 10 as viewed along direction II-II in FIG. 13 is equivalent to that shown in FIG. 1 described above, though this is not shown in the drawings.

In the embodiment, as shown in FIG. 13, two display pixels disposed adjacent to each other in the column direction (Y-direction) forms one display pixel group. The display pixel groups are two-dimensionally arranged.

TFT sensors T0 and T1 are alternately arranged in the row direction so that one TFT sensor T0 or T1 is arranged in the area between the display pixel groups arranged adjacent to each other in the row direction. As shown in FIG. 13, each sensor gate line 121 is disposed in the free area between the two display pixels in the respective rows sandwiched between two gate lines 111.

The length of each of TFT sensors T0 and T1 is set to be the same as or slightly smaller than that of one display pixel group in the column direction, that is, to be the same as or slightly smaller than a length that is twice as large as that of one display pixel in the column direction. Thus, the resolution of the optical sensor is equivalent to that in the configuration according to the first embodiment.

In the present embodiment, TFT sensors T0 and T1 are arranged as described above, reducing the number of the sensor gate lines 121 to half of that in the first embodiment. This enables an increase in the aperture rate of each display pixel.

TFT sensors T0 and T1 are arranged as described above. Thus, as shown in FIG. 13, in two display pixels arranged adjacent to each other in the column direction of each display pixel group, a pixel TFT-T2 and the gate line 111 are disposed in a mirror relationship with respect to the sensor gate line 121.

That is, as shown FIG. 13, for every two display pixels in the respective rows which form the display pixel group, the gate lines 111 are disposed along the row direction of the display panel 10 so as to sandwich the two display pixels between the gate lines 111. In each of the two display pixels of each display pixel group, the pixel TFT-T2 is provided in proximity to and connected to the corresponding gate line 111.

That is, the display panel 10 is viewed from the front and a +Y-direction side and –Y-direction side are defined to be an upper side and a lower side, respectively. Then, for the upper one of the two display pixels in the respective rows sandwiched between the two gate lines 111, the pixel TFT-T2 is provided on the upper side of the pixel electrode 114 so that the upper side of the upper display pixel is connected, via the pixel TFT-T2, to the gate line 111 disposed adjacent to the upper display pixel. For the lower display pixel, the pixel TFT-T2 is provided on the lower side of the pixel electrode 114 so that the lower side of the lower display pixel is connected, via the pixel TFT-T2, to the gate line 111 disposed adjacent to the lower display pixel.

Figure 14:
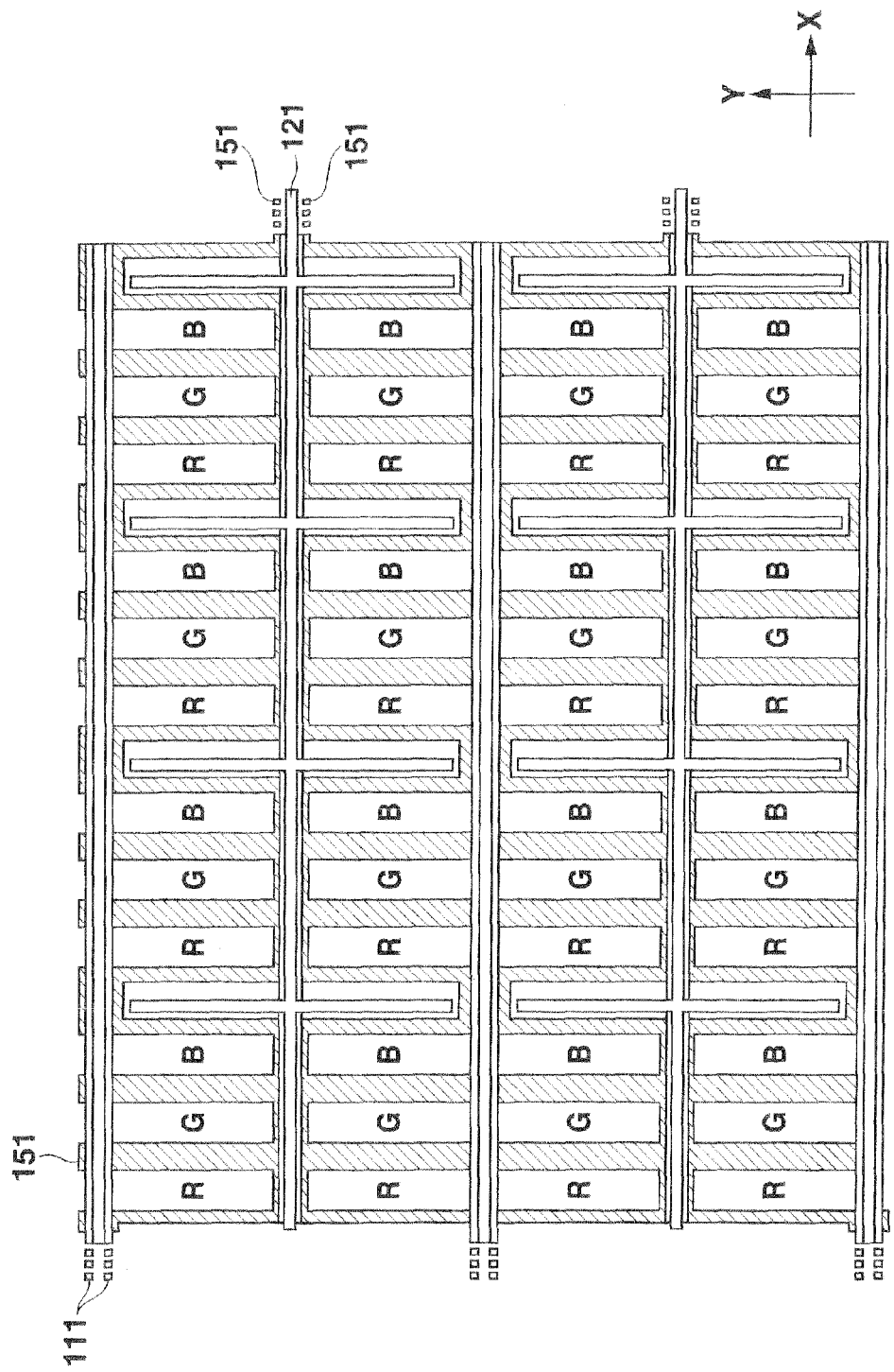
FIG. 14 is a diagram showing a layout of gate lines, sensor gate lines, and capacitance lines according to the second embodiment.

FIG. 14 is a diagram showing a layout of the gate lines 111, the sensor gate lines 121, and capacitance lines 151 according to the present embodiment.

All these lines are formed on the same layer in the TFT substrate 101.

As described above, for every two rows of display pixels, the gate lines 111 are disposed along the row direction at positions where the two display pixels in the respective rows are sandwiched between the gate lines.

That is, the gate lines 111 are disposed at an upper position of the display pixel in the first row, at a lower position of the display pixel in the second row, at an upper position of the display pixel in the third row, at a lower position of the display pixel in the fourth row, ..., at an upper position of the display pixel in the N–1$^{th}$ row, and at a lower position of the display pixel in the N$^{th}$ row, respectively. In other words, the gate lines 111 are disposed in the area between the display pixel in the second row and the display pixel in the third row, in proximity to the two gate lines 111 disposed at the lower position of the display pixel in the second row and at the upper position of the display pixel in the third row. Likewise, the gate line 111 are disposed in the area between the display pixel in the fourth row and the display pixel in the fifth row, ..., in the area between the display pixel in the N–2$^{th}$ row and the display pixel in the N–1$^{th}$ row, in proximity to the two gate lines 111.

For every two rows of display pixels, each sensor gate line 121 is arranged between the two display pixels in the respective rows. The sensor gate lines 121 are arranged at the position between the display pixel in the first row and the display pixel in the second row, at the position between the display pixel in the third row and the display pixel in the fourth row, ..., and at the position between the display pixel in the N–1$^{th}$ row and the display pixel in the N$^{th}$ row, respectively. Moreover, as described above, the sensor gate line 121 also serves as the gate electrode of the TFT sensor. The sensor gate lines 121 are arranged adjacent to one another in the row direction with respect to the display pixel groups and are extended in the column direction to form the gate electrodes of the TFT sensors.

In the present embodiment, the capacitance lines 151 are also arranged in a mirror image relationship with respect to each display pixel group as shown in FIG. 14.

As shown in FIG. 14, the capacitance lines 151 are laid out with respect to one display pixel group so that the sensor gate line 121 is sandwiched between the capacitance lines 151 and so that each of the capacitance lines 151 lies opposite outer peripheral portions of the display pixels.

When arranged as described above, the gate lines 111, the sensor gate lines 121, and the capacitance lines 151 are prevented from crossing one another and being electrically continuous with one another.

Moreover, one sensor gate line 121 is used to drive TFT sensors each corresponding to one display pixel group and having a light receiving area which is double that in the first embodiment.

As described above, compared to the first embodiment in which one TFT sensor is provided in association with one display pixel, the embodiment can reduce the number of the sensor gate lines 121 to half. The area occupied by Sensor gate lines 121 in the display panel 10 can be reduced, enabling the aperture ratio per display pixel to be improved.

Furthermore, in the present embodiment, the gate line 111 and the sensor gate line 121 avoid being disposed in proximity to each other. This enables controlling of interference between the signal voltage applied to the gate line 111 and the signal voltage applied to the sensor gate line 121.

The present embodiment can thus suppress the adverse effect of driving of the optical sensor of the thin-film-transistor type on the display state of each display pixel as well as the adverse effect of driving of each display pixel on the detection, by the optical sensor of the thin-film-transistor type, of the position touched by the user.

Figure 15:
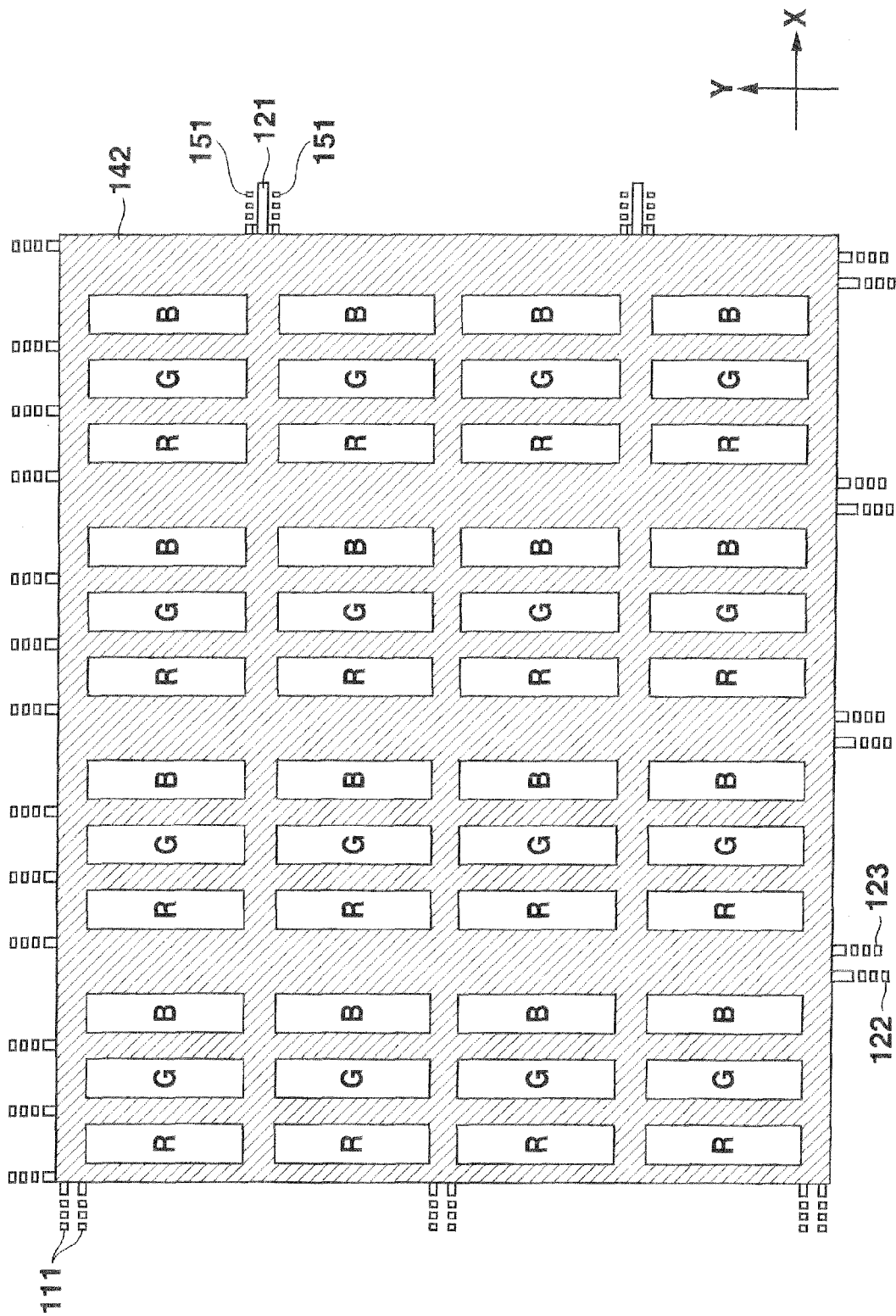
FIG. 15 is a front view showing that a light blocking film is formed on a color filter substrate in GU the display panel according to the second embodiment.

FIG. 15 is a front view showing that the light blocking film 142 is formed on the color filter substrate 102.

As described above, the TFT sensors according to the present embodiment detect reflected light from the backlight 104 in the plane of the display panel 10.

Since no external light needs to be incident on TFT sensors T0 and T1, the areas of TFT sensors T0 and T1 can be completely covered with the light blocking film 142 as shown in FIG. 15.

Thus, when the display panel 10 is observed, the periodic structures other than the display pixels are not visible. If the periodic structures other than the display pixels are visible, image quality is affected.

As shown in FIG. 15, the gate lines 111 are arranged in a mirror image relationship with respect to the display pixel group including two display pixels arranged adjacent to each other in the column direction.

The sensor gate line 121 is arranged in the free area created between the display pixel groups. The TFT sensors each having a light receiving area corresponding to two display pixels are connected to the sensor gate line 121.

This reduces the numbers of TFT sensors T0 and T1 and the sensor gate lines 121 to half of those in the first embodiment.

The present embodiment can thus improve the aperture ratio of the display pixel compared to the above-described first embodiment.

Now, the circuit configuration of the display panel 10 according to the present embodiment will be described. In the present embodiment, an applicable drive circuit for driving the optical sensors of the thin-film-transistor type built into the display panel 10 may be configured equivalently to the drive circuit according to the first embodiment.

Figure 16:
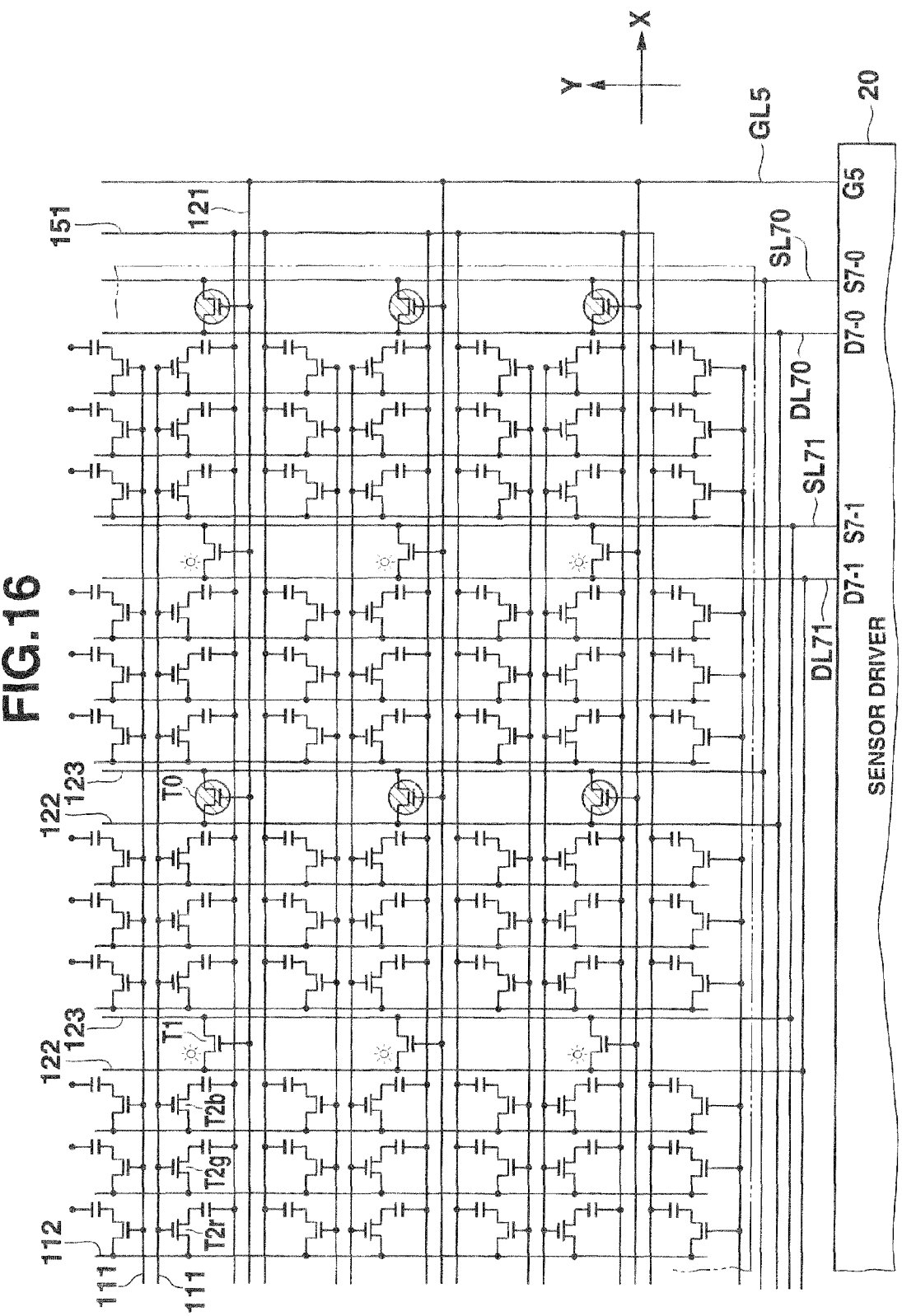
FIG. 16 is a diagram showing a detailed circuit configuration of a part of one division area in the display panel shown in FIG. 13 which part corresponds to portion A of FIG. 5.

FIG. 16 is a diagram showing a detailed circuit configuration of a part of one of the division area 11 in the display panel 10 shown in FIG. 13 which part corresponds to portion A of FIG. 5.

As shown in FIG. 16, TFT sensors T0 and T1 arranged in the same row share one sensor gate line 121. Shared sensor gate lines 121 corresponding to one division area 11 are all connected to a common gate line GL5 outside the display area. The common gate line GL5 is connected to a gate terminal G5 of a sensor driver 20.

Furthermore, TFT sensors T0 arranged in the same column share one sensor drain line 122. Shared sensor drain lines 122 corresponding to one division area 11 are all connected to a common drain line (first sensor drain line) DL70 outside the display area. Common drain line DL70 is connected to a drain terminal D7-0 of the sensor driver 20.

Similarly, TFT sensors T1 arranged in the same column share one sensor drain line 122. Shared sensor drain lines 122 corresponding to one division area 11 are all connected to a common drain line (second sensor drain line) DL71 outside the display area. Common drain line DL71 is connected to a drain terminal D7-1 of the sensor driver 20.

Additionally, TFT sensors T0 arranged in the same column share one sensor source line 123. Shared sensor source lines 123 corresponding to one division area 11 are all connected to a common source line (first sensor source line) SL70 outside the display area. The common source line SL70 is connected to a source terminal S7-0 of the sensor driver 20.

Moreover, TFT sensors T1 arranged in the same column share one sensor source line 123. Shared sensor source lines 123 corresponding to one division area 11 are all connected to a common source line (second sensor source line) SL71 outside the display area. The common source line SL71 is connected to a source terminal S7-1 of the sensor driver 20.

In the configuration of the display panel 10 according to the present embodiment shown in FIG. 13, two display pixels arranged adjacent to each other in the column direction form one display pixel group.

However, the invention is not limited to this configuration. An even number of more than two display pixels arranged adjacent to one another in the column direction may form one display pixel group.

In this case, the sensor gate line 121 is provided at the position between two sets of an equal number of display pixels into which the even number of display pixels disposed in the column direction and forming one display pixel group are divided. Furthermore, each of TFT sensors T0 and T1 is set to have substantially the same length as that of one display pixel group in the column direction.

For example, if four display pixels arranged adjacent to each other in the column direction form one display pixel group, the sensor gate line 121 is provided in the display pixel group between the display pixel in the second row and the display pixel in the third row. Each of TFT sensors T0 and T1 is set to have substantially the same length as that of four display pixels in the column direction.

In this case, the aperture ratio of the display pixel can further be improved.

<Third Embodiment>

Now, a third embodiment of the invention will be described.

Figure 17:
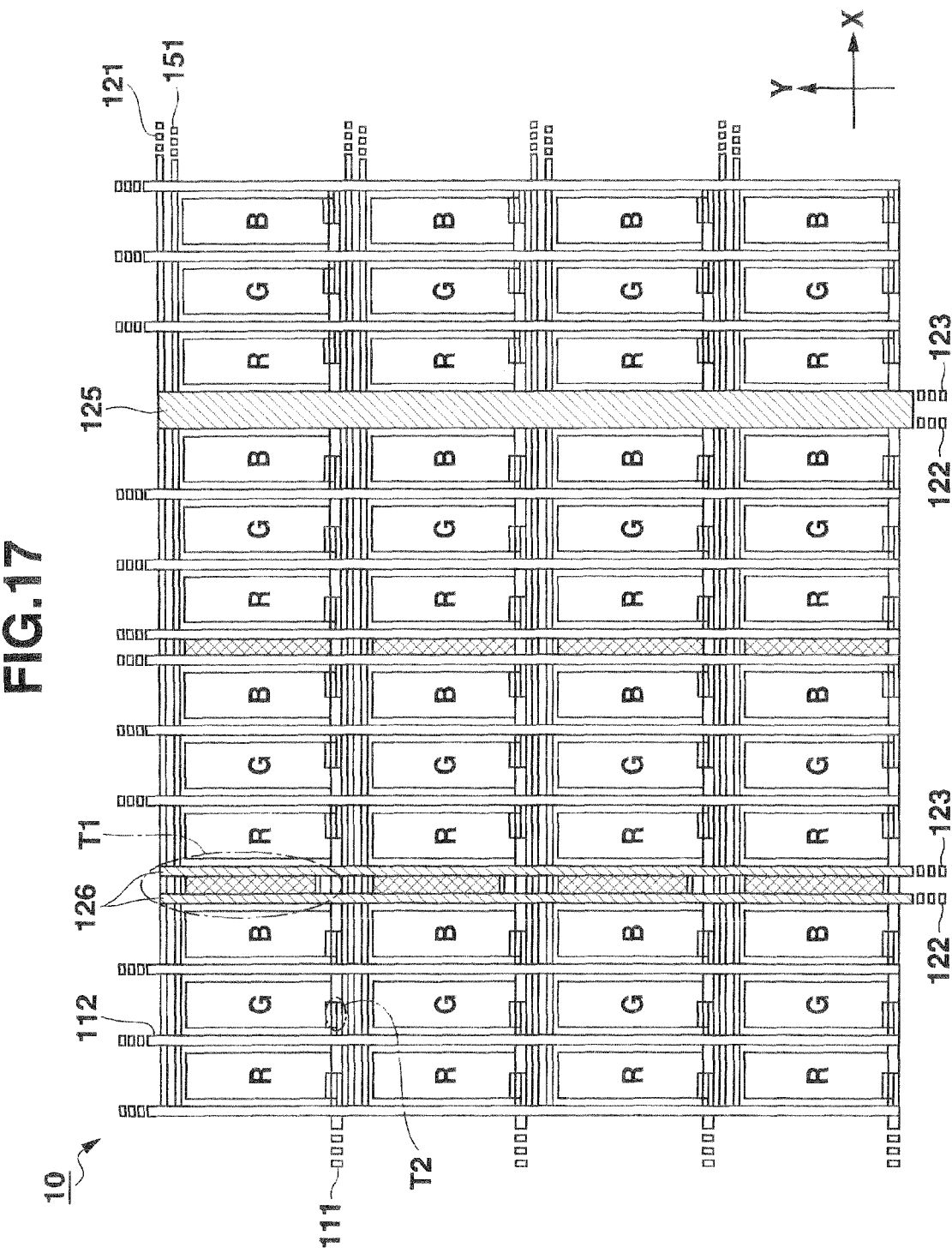
FIG. 17 is a front view showing an example of a display panel comprising an optical sensor device according to a third embodiment.

FIG. 17 is a front view showing an example of a display panel 10 comprising an optical sensor device according to a third embodiment of the invention.

The display panel 10 in FIG. 17 forms a liquid crystal display apparatus with built-in optical sensors of the thin-film-transistor type. Here, components of the display panel 10 which are equivalent to those shown in FIG. 4 are denoted by the same reference numbers. Description of these components is omitted or simplified.

Like the display panels 10 according to the first and second embodiments, the display panel 10 according to the present embodiment comprises display pixels including three subpixels corresponding to color filters 141 for the three colors, red (R), green (G), and blue (B). The display pixels are two-dimensionally arranged.

As is the case with the first embodiment, the optical sensor device according to the present embodiment includes optical sensors of the thin-film-transistor type comprising TFT sensors T0 and T1. However, the optical sensor device according to the present embodiment is different from that according to the first and second embodiment in the arrangement of TFT sensors T0 and T1 in the column direction and in the numbers of TFT sensors T0 and T1 disposed on the display panel 10. The optical sensor device according to the present embodiment is also different from that according to the first embodiment in the arrangement of sensor drain lines 122 and sensor source lines 123.

Gate lines 111 and sensor gate lines 121 are disposed along the row direction (X-direction shown in FIG. 17) of a TFT substrate 101. Drain lines 112, sensor drain lines 122, and sensor source lines 123 are disposed along the column direction (Y-direction shown in FIG. 17) of the TFT substrate 101.

In the present embodiment, as shown in FIG. 17, two display pixels disposed adjacent to each other in the row direction (X-direction) form one display pixel group. The display pixel groups are two-dimensionally arranged.

TFT sensors T0 and T1 are each disposed only in the area between the two display pixels arranged adjacent to each other in the row direction. On the other hand, neither TFT sensor T0 nor TFT sensor T1 is disposed in the area between the display pixel groups arranged adjacent to each other in the row direction. TFT sensors T0 and T1 are alternately disposed in the area between the two display pixels in each display pixel group arranged in the row direction.

The sensor gate lines 121, the sensor drain lines 122, and the sensor source lines 123 are connected to TFT sensors T0 and T1. The sensor drain lines 122 and the sensor source lines 123 are each disposed so as to extend between the display pixel groups in the column direction.

To dispose TFT sensors T0 and T1 as described above, the following configuration is provided. In the two display pixels arranged adjacent to each other in the row direction of the display pixel groups, pixels TFT-T2 and the drain lines 112 are disposed in a mirror image relationship with respect to the sensor drain line 122 and the sensor source line 123 as shown in FIG. 17.

When the display panel 10 is seen from the front, a +X-direction is defined to be the right, whereas a −X-direction is defined to be the left. Then, in the left one of the two display pixels in each display pixel group, the pixel TFT-T2 is provided on the left of the pixel electrode 114 so as to connect the pixel electrode 114 to the adjacently disposed drain line 112 from the left via the pixel TFT-T2. In the right display pixel, the pixel TFT-T2 is provided on the right of the pixel electrode 114 so as to connect the pixel electrode 114 to the adjacently disposed drain line 112 from the left via the pixel TFT-T2.

The length of each of TFT sensors T0 and T1 in the column direction is the same as or slightly smaller than that of one display pixel in the column direction.

Figure 18:
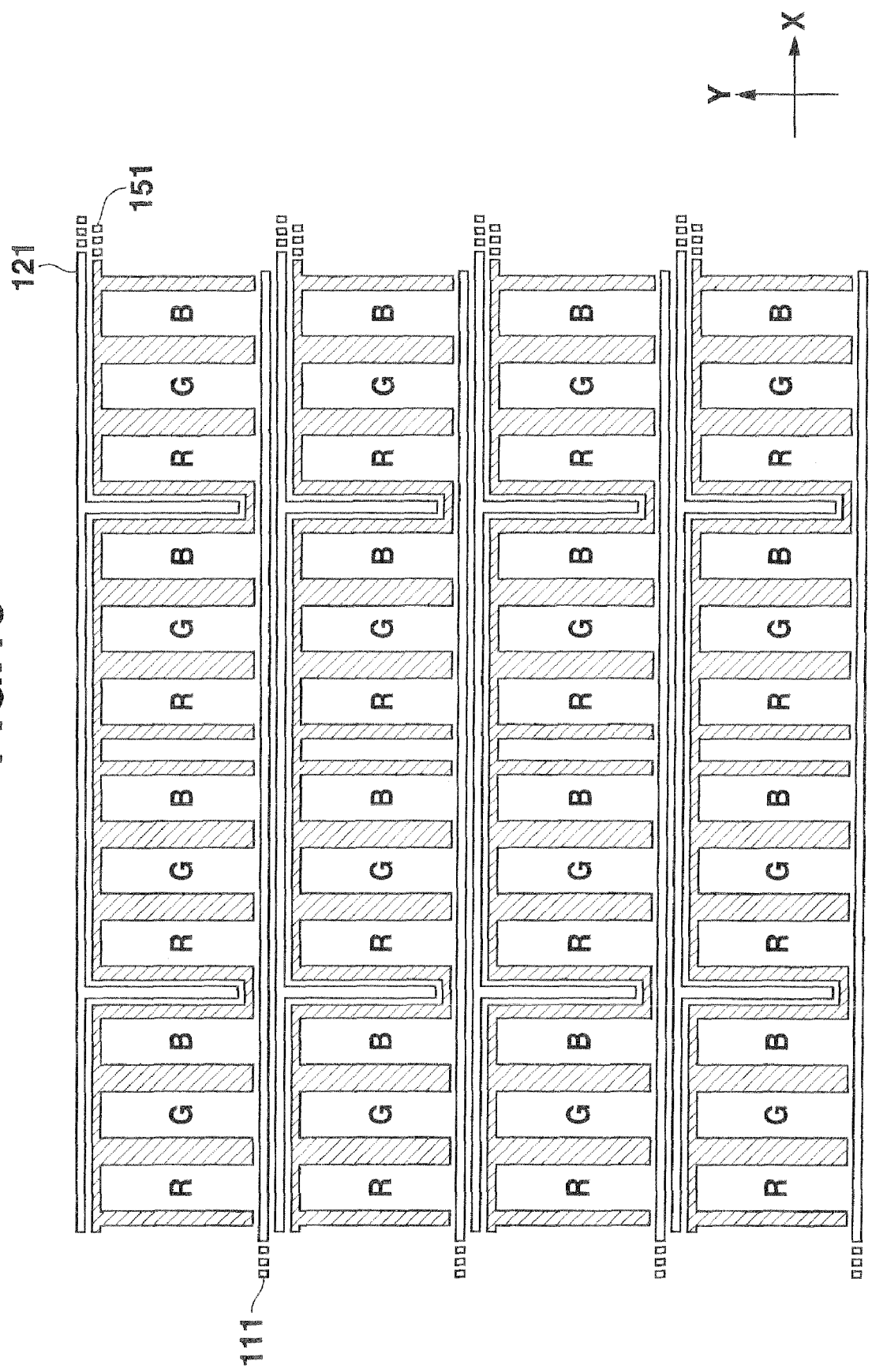
FIG. 18 is a diagram showing a layout of gate lines, sensor gate lines, and capacitance lines according to the third embodiment.

FIG. 18 is a diagram showing a layout of the gate lines 111, the sensor gate lines 121, and capacitance lines 151 according to the present embodiment.

As shown in FIG. 18, the gate line 111, the sensor gate line 121, and the capacitance line 151 are arranged, for each row of the display pixels, in the respective areas between which the display pixels in each row are sandwiched.

In the present embodiment, the TFT sensors are each arranged between the display pixel groups each including two display pixels arranged adjacent to each other in the row direction. The drain lines 112 are arranged in a mirror image relationship with respect to the TFT sensor, the sensor drain line 122, and the sensor source line 123.

This reduces the numbers of TFT sensors T0 and T1, the sensor drain lines 122, and the sensor source lines 123 to half of those in the first embodiment.

The present embodiment can thus improve the aperture ratio of the display pixel compared to the first embodiment.

In the configuration of the display panel 10 according to the present embodiment shown in FIG. 17, two display pixels arranged adjacent to each other in the row direction form one display pixel group.

However, the present invention is not limited to this configuration. An even number of more than two display pixels arranged adjacent to one another in the row direction may form one display pixel group.

In this case, TFT sensor T0 or T1, the sensor drain line 122, and the sensor source line 123 are provided at the position between two sets of an equal number of display pixels into which the even number of display pixels disposed in the column direction and forming one display pixel group are divided.

For example, if four display pixels arranged adjacent to each other in the row direction form one display pixel group, the TFT sensor, the sensor drain line 122, and the sensor source line 123 are provided in the display pixel group between the display pixel in the second column and the display pixel in the third column.

In this case, the aperture ratio of the display pixel can further be improved.

<Fourth Embodiment>

Now, a fourth embodiment of the present invention will be described.

Figure 19:
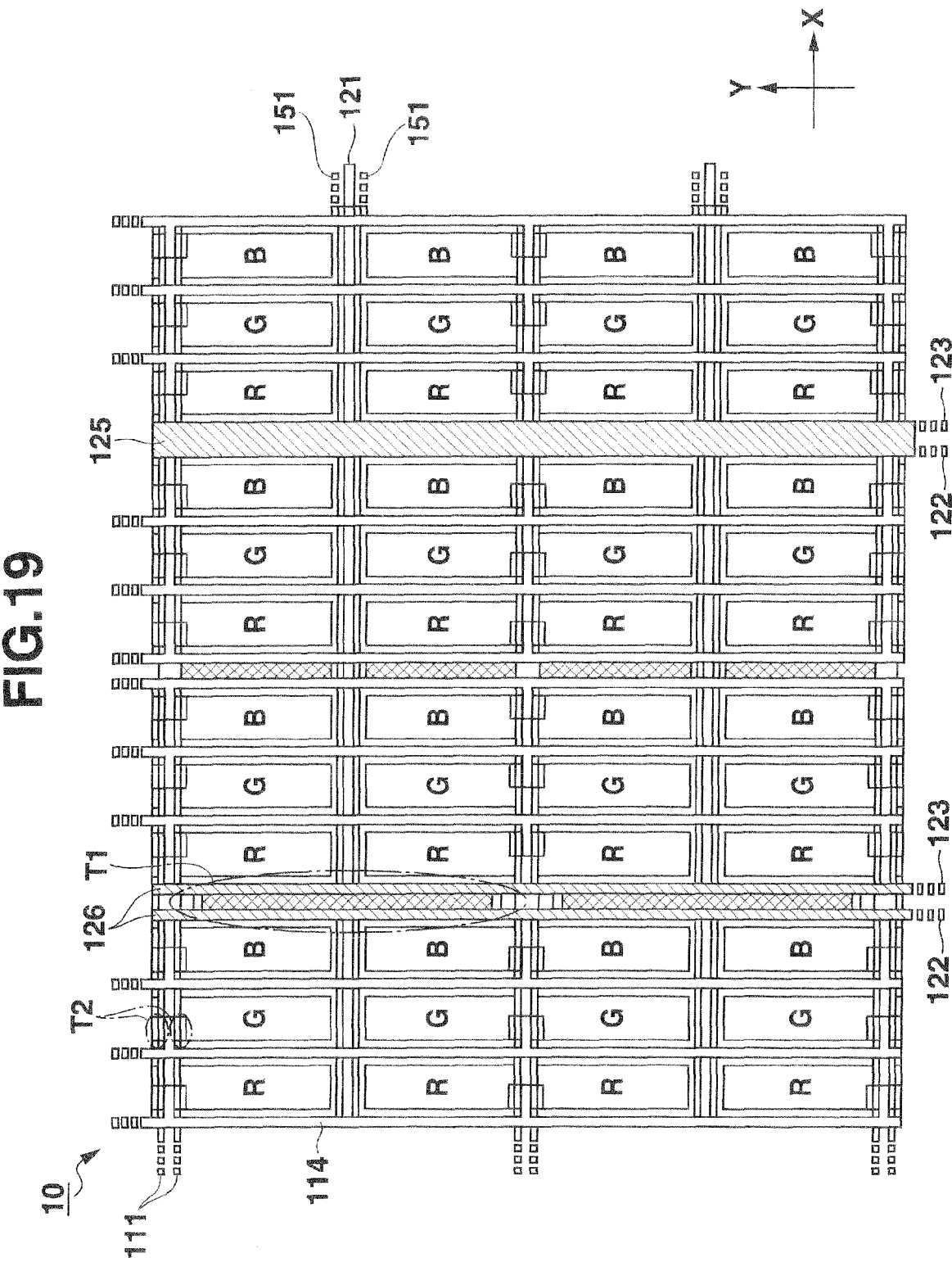
FIG. 19 is a front view showing an example of the display panel comprising the optical sensor device according to the fourth embodiment.

FIG. 19 is a front view showing an example of a display panel 10 comprising an optical sensor device according to a fourth embodiment of the present invention.

The present embodiment has a configuration corresponding to a combination of the second embodiment and the third embodiment.

The display panel 10 in FIG. 19 forms a liquid crystal display apparatus with built-in optical sensors of the thin-film-transistor type. Here, components of the display panel 10 which are equivalent to those shown in FIG. 13 and FIG. 17 are denoted by the same reference numbers. Description of these components is omitted.

Like the display panels 10 according to the first and second embodiments, the display panel 10 according to the present embodiment comprises display pixels including three subpixels corresponding to color filters 141 for the three colors, red (R), green (G), and blue (B). The display pixels are two-dimensionally arranged.

As is the case with the first embodiment, the optical sensor device according to the present embodiment includes optical sensors of the thin-film-transistor type comprising TFT sensors T0 and T1. However, the optical sensor device according to the present embodiment is different from that according to the first embodiment in the size of each of TFT sensors T0 and T1 in the column direction. The optical sensor device according to the present embodiment is also different from that according to the first embodiment in the arrangement in the row direction, the numbers of TFT sensors T0 and T1 disposed on the display panel 10, and the arrangement of sensor gate lines 121, sensor drain lines 122, and sensor source lines 123.

In the present embodiment, as shown in FIG. 19, four display pixels disposed in two adjacent rows and in two adjacent columns form one display pixel group. The display pixel groups are two-dimensionally arranged.

TFT sensors T0 and T1 are each disposed only at the position between the two display pixels included in each of the display pixel groups. On the other hand, neither TFT sensor T0 nor TFT sensor T1 is disposed in the area between the display pixel groups arranged adjacent to each other in the row direction. TFT sensor T0 or TFT sensor T1 is set to have substantially the same length as that of the display pixel group in the column direction. TFT sensors T0 and T1 are alternately disposed at the respective positions between the two display pixels included in each of the display pixel groups arranged in the row direction.

This reduces the numbers of TFT sensors T0 and T1 to a quarter of those in the first embodiment, while reducing the numbers of the sensor gate lines 121, the sensor drain lines 122, and the sensor source lines 123 to half of those in the first embodiment.

The present embodiment can thus improve the aperture ratio of the display pixel compared to the second and third embodiment.

Moreover, also in the present embodiment, display pixels disposed in an even number of more than two adjacent rows and in an even number of more than two adjacent columns may form one display pixel group.

In this case, TFT sensor T0 or T1, the sensor drain line 122, and the sensor source line 123 are provided at the position between two sets of an equal number of display pixels forming one display pixel group in the row direction.

In this case, the aperture ratio of the display pixel can further be improved.

<Fifth Embodiment>

Now, a fifth embodiment of the invention will be described.

The present embodiment illustrates another embodiment of a sensor driver 20 applicable to the first to fourth embodiments.

The first embodiment is configured such that the buffer circuit BUF makes the source voltage of TFT sensor T0 equal to that of TFT sensor T1 as shown in FIG. 7. In contrast, a configuration according to the present embodiment can exert effects similar to those of the circuit shown in FIG. 7 without the buffer circuit BUF.

Figure 20:
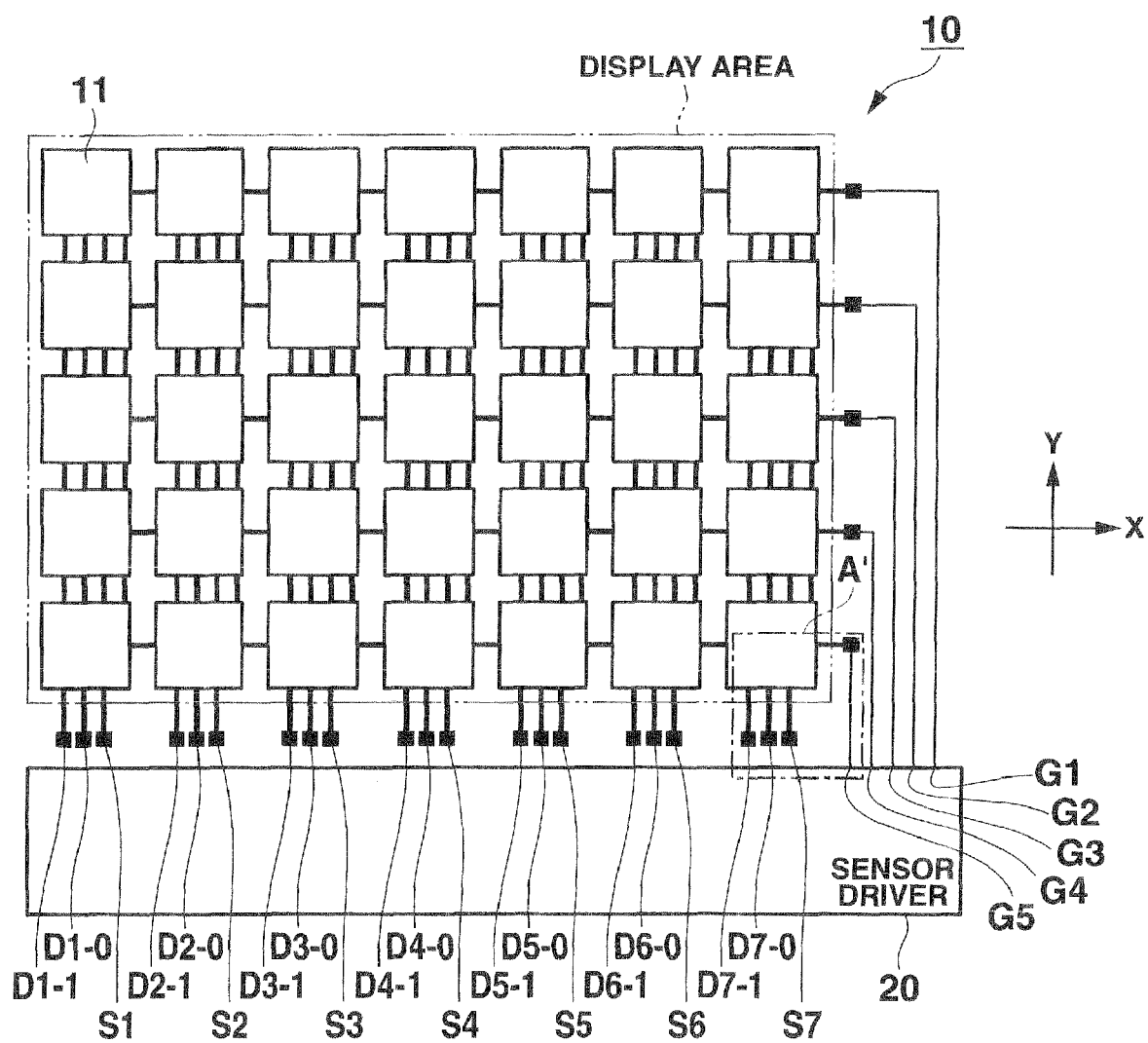
FIG. 20 is a diagram schematically illustrating area division of a display area according to the fifth embodiment.

FIG. 20 is a diagram schematically showing how a display area is divided according to the fifth embodiment of the invention.

Figure 21:
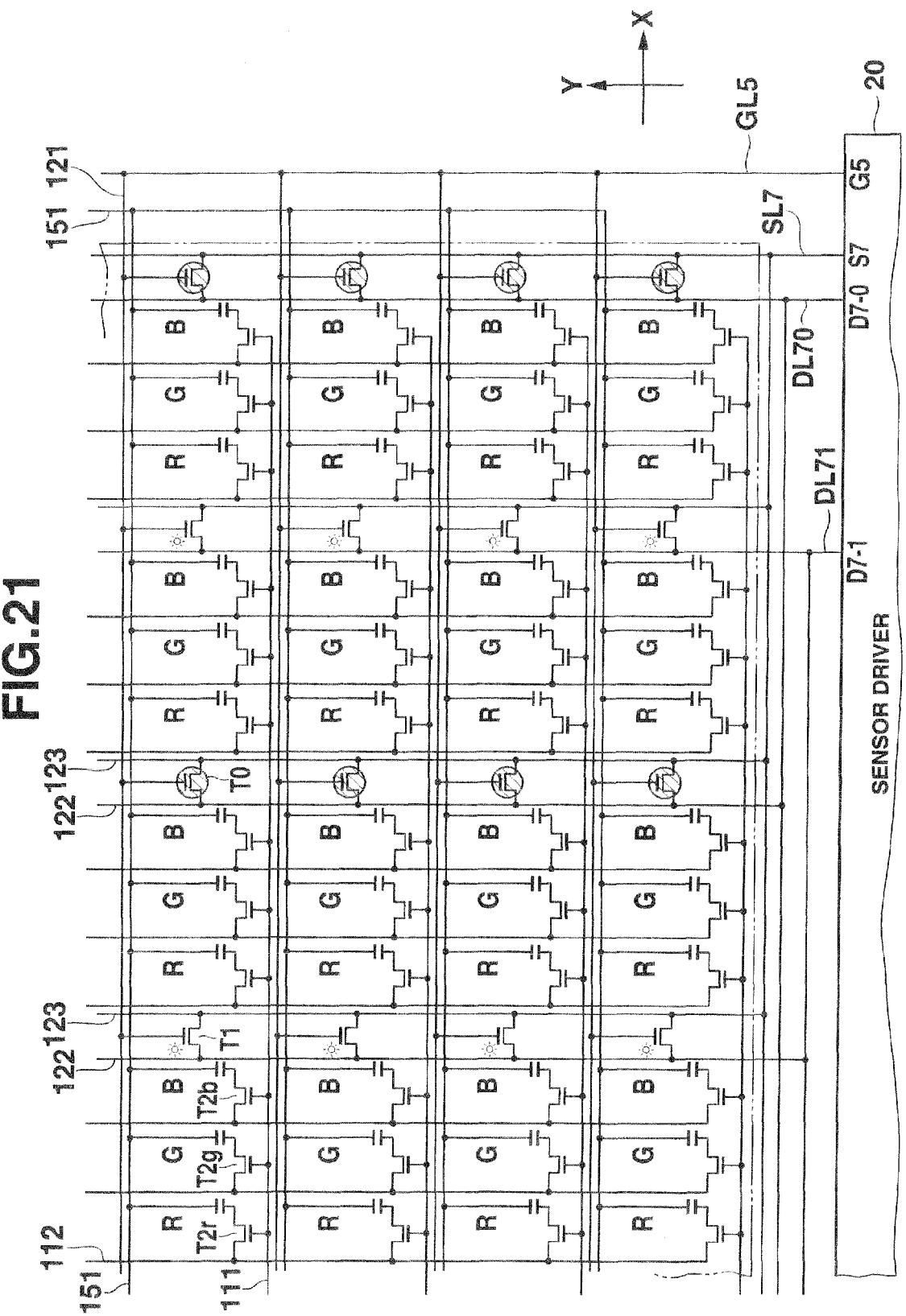
FIG. 21 is a diagram showing a detailed circuit configuration of a portion A' of FIG. 20.

FIG. 21 is a diagram showing a detailed circuit configuration of a portion A' of FIG. 20.

Figure 22:
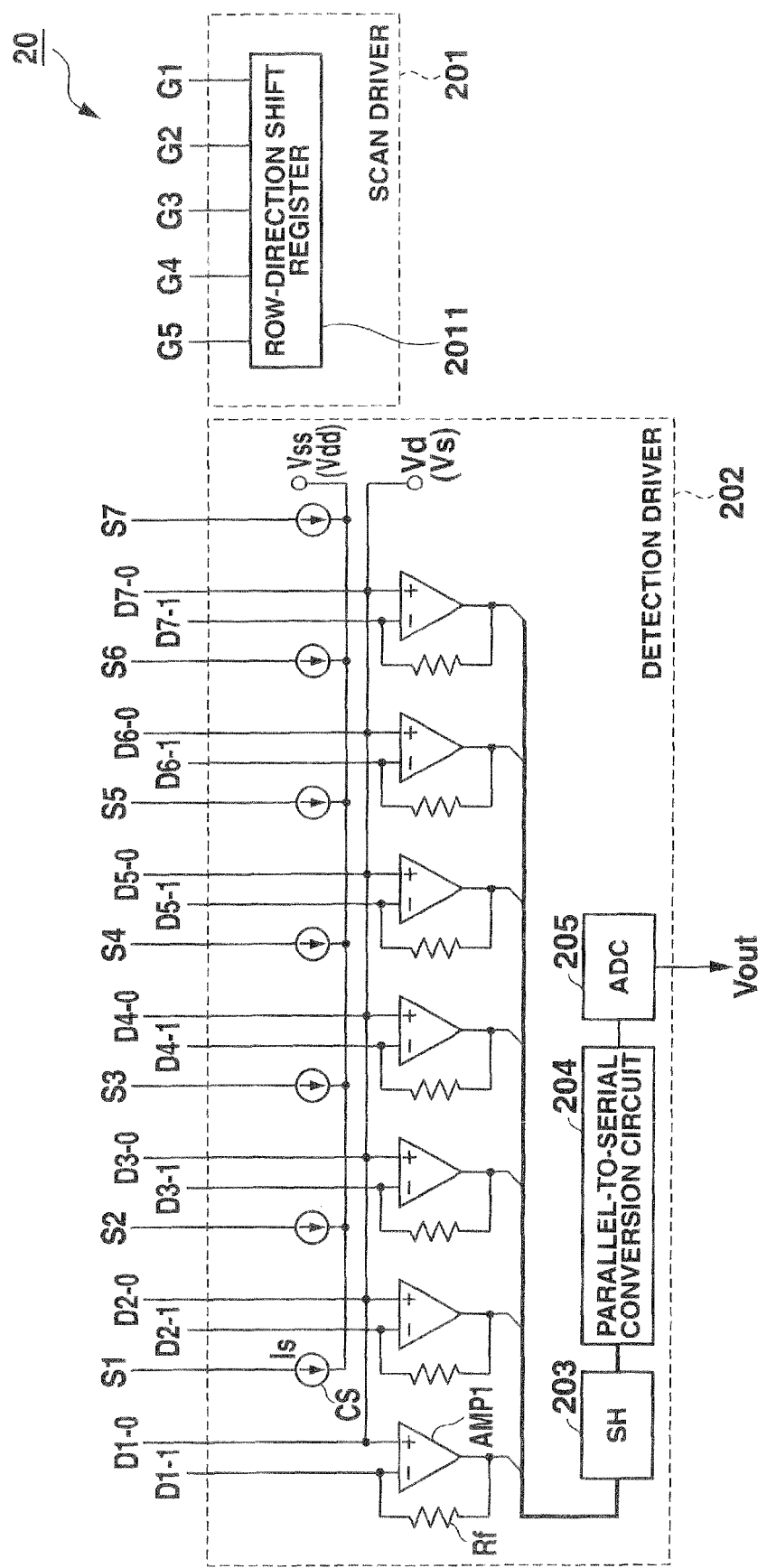
FIG. 22 is a circuit diagram showing a circuit configuration of a sensor driver according to the fifth embodiment.

FIG. 22 is a circuit diagram showing an example of a circuit configuration of the sensor driver 20 according to the present embodiment.

Here, components of the fifth embodiment which are equivalent to those shown in FIG. 5 to FIG. 7 are denoted by the same reference numbers. Description of these components is omitted or simplified.

In the first embodiment, the sensor source line 123 for TFT sensors T0 and the sensor source line 123 for TFT sensor T1 are individually connected to the sensor driver 20 as shown in FIG. 5.

In contrast, in the present embodiment, the sensor source line 123 for TFT sensors T0 and the sensor source line 123 for TFT sensor T1 are joined together into a common sensor source line 123, which is connected to the sensor driver 20, as shown in FIG. 20 and FIG. 21.

As shown in FIG. 21, TFT sensors T0 and T1 arranged in the same row share one sensor gate line 121. Moreover, shared sensor gate lines 121 corresponding to one division area 11 are connected to a common gate line GL5 outside the display area. The common gate line GL5 is connected to a gate terminal G5 of the sensor driver 20.

Furthermore, TFT sensors T0 arranged in the same column share one sensor drain line 122. Moreover, shared sensor drain lines 122 corresponding to one division area 11 are connected to a common drain line (first sensor drain line) DL70. Common drain line DL70 is connected to a drain terminal D7-0 of the sensor driver 20.

Likewise, TFT sensors T1 arranged in the same column share one sensor drain line 122. Moreover, shared sensor drain lines 122 corresponding to one division area 11 are connected to a common drain line (second sensor drain line) DL71. Common drain line DL71 is connected to a drain terminal D7-1 of the sensor driver 20.

Additionally, TFT sensors T0 arranged in the same column share one sensor source line 123 and TFT sensors T1 arranged in the same column share one sensor source line 123. Moreover, shared sensor source lines 123 corresponding to one division area 11 are connected to a common source line (a common-second-signal-line) SL7. The common source line SL7 is connected to a source terminal S7 of the sensor driver 20.

The sensor driver 20 according to the present embodiment shown in FIG. 22 is different from that according to the first embodiment shown in FIG. 7 in that source terminals Sm (m=1, 2, . . . , 7) connected to respective common source lines SLm (m=1, 2, . . . , 7) are connected to a current source CS without involving the buffer circuit BUF.

A detection driver 202 according to the present embodiment includes drain terminals and source terminals the number of which is the same as that of the common drain lines DLm and the common source lines SLm in a display panel 10 (in the example illustrated in FIG. 22, 7×2=14 drain terminals+7 source terminals=21).

Drain terminals Dm–0 (m=1, 2, . . . , 7; the drain terminals corresponds to those shown in FIG. 21) connected to the drain terminals of TFT sensors T0 are each connected to a non-inverting input terminal of an operational amplifier AMP1. A voltage source configured to provide a potential Vd is connected to the non-inverting input terminals.

Furthermore, drain terminals Dm–1 (m=1, 2, . . . , 7) connected to the drain terminals of TFT sensors T1 are each connected to an inverting input terminal of the operational amplifier AMP1.

Additionally, a resistor Rf is connected between the inverting input terminal and an output terminal the operational amplifier AMP1. The operational amplifier AMP1 and the resistor Rf form a current-to-voltage conversion circuit.

In addition, source terminals Sm (m=1, 2, . . . , 7) connected to the respective common source lines SLm (m=1, 2, . . . , 7) are connected to one end of the current source CS. The other end of the current source CS is connected to a voltage source configured to provide a voltage Vss (Vss<Vd).

The current source CS is of a current intake type and allows a current Is to flow in an intake direction from the source terminal Sm connected to one end of the current source CS to the voltage source Vss connected to the other end.

Now, the operation of the sensor driver 20 shown in FIG. 22 will be described.

Figure 23A:
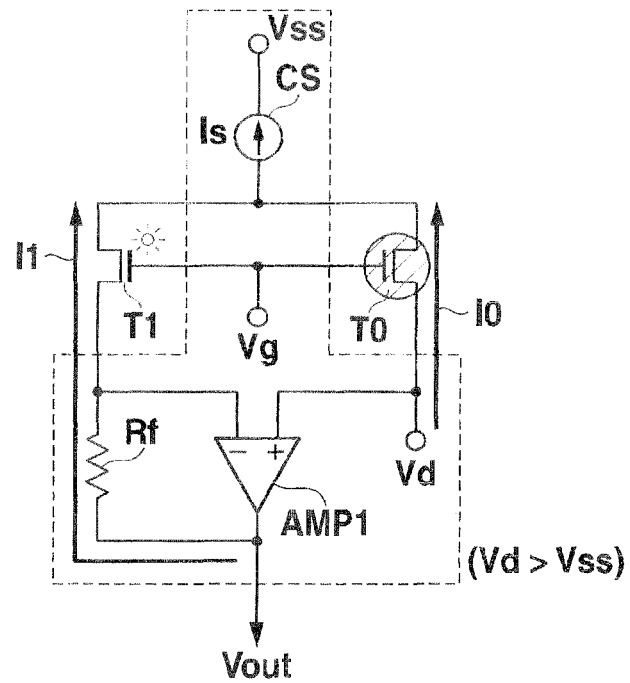
FIG. 23A is an equivalent circuit diagram of a drive circuit formed for one sensor pair by the sensor driver according to the fifth embodiment.

FIG. 23A is an equivalent circuit diagram of a drive circuit formed by the sensor driver 20 according to the present embodiment for one sensor pair.

Figure 23B:
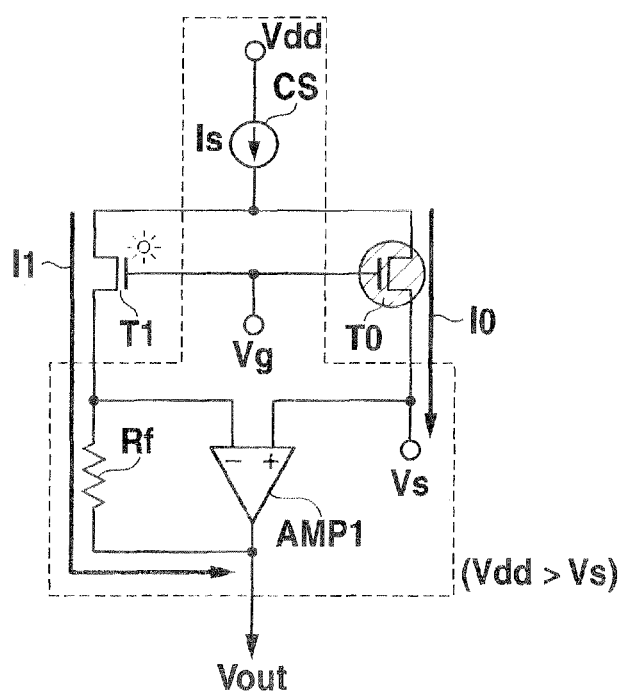
FIG. 23B is an equivalent circuit diagram of a drive circuit formed for one sensor pair by the sensor driver according to the fifth embodiment when a current source is of a current discharge type.

FIG. 23B is an equivalent circuit diagram of a drive circuit formed by the sensor driver 20 according to the present embodiment for one sensor pair when the current source CS is of the current intake type.

The operation of the sensor driver 20 will be described with reference to the equivalent circuit diagram in FIG. 23A.

As shown in FIG. 23A, the source electrode of TFT sensor T0 and the source electrode of TFT sensor T1 are connected to one end of the current source CS. The other end of the current source CS is connected to the voltage source configured to provide the potential Vss (Vd>Vss).

The gate electrode of TFT sensor T0 and the gate electrode of TFT sensor T1 are jointly connected to a voltage source configured to provide a voltage Vg.

The drain electrode of TFT sensor T0 is connected to the non-inverting input terminal of the operational amplifier AMP1 and to the voltage source configured to provide the potential Vd (Vd>Vss).

The drain electrode of TFT sensor T1 is connected to the inverting input terminal of the operational amplifier AMP1.

The resistor Rf is connected between the inverting input terminal and output terminal of the operational amplifier AMP1. The operational amplifier AMP1 and the resistor Rf form the current-to-voltage conversion circuit.

In the operation of the sensor driver 20, in the initial state, row-direction shift register 2011 applies no voltage. In this state, all the TFT sensors in the display area are in an unselected state, and a drain current corresponding to a selected state is precluded from flowing through the sensors.

Then, in the initial state where all the TFT sensors are in the unselected state, the row-direction shift register 2011 first sets the voltage Vg of a gate terminal G1 corresponding to division areas 11 in the first row shown in FIG. 20, equal to an on-level voltage for TFT sensors T0 and T1, in order to place TFT sensors T0 and T1 connected to the gate terminal G1, in the selected state.

On the other hand, the voltage of gate terminals G2 to G5 is set equal to an off-level voltage for TFT sensors T0 and T1.

When all TFT sensors T0 and T1 contained in the division areas in the first row connected to the gate terminal G1 are set to the selected state by the row-direction shift register 2011, TFT sensors T0 and T1 output a drain current corresponding to the selected state and the state in which the user's finger or the like is or is not touching any of the division areas. Thus, the device can determine whether or not the user's finger or the like is touching any of the division areas 11 in the first row.

More specifically, an imaginary short-circuiting action of the operational amplifier AMP1 makes the drain voltage of TFT sensor T0 equal to that of TFT sensor T1. Here, the voltage source Vd fixes the drain voltage of TFT sensor T0 to a given magnitude Vd. Thus, the drain voltage of TFT sensor T1 is also Vd. The specific magnitude of Vd is not particularly limited, but for example, Vd=0.

Furthermore, the current source CS allows a given current Is to flow from TFT sensor T0 and TFT sensor T1 toward voltage Vss.

Furthermore, since the sensor source line 123 for TFT sensor T0 and the sensor source line 123 for TFT sensor T1 are joined together into the common sensor source line 123, the source voltage of TFT sensor T0 is equal to that of TFT sensor T1. Thus, each of the electrodes of TFT sensor T0 has a voltage equal to that of the corresponding one of the electrodes of TFT sensor T1. Here, a drain current through TFT sensor T0 is denoted by I0. A drain current through TFT sensor T1 is denoted by I1.

In this state, if light from a backlight 104 does not enter a photoelectric conversion section 124 of TFT sensor T1, that is, the user's finger or the like is touching any of the division areas 11 in the first row, the drain current I1 in TFT sensor T1 is equal to the drain current I0 in TFT sensor T0. The drain currents I0 and I1 correspond to a dark current in TFT sensors T0 and T1. The dark current is denoted by Id0.

Here, since the sensor source line 123 shared by TFT sensor T0 and TFT sensor T1 is connected to the current source CS, if TFT sensor T0 and TFT sensor T1 have the same size, Is=I0+I1 and I0=I1=Id0=Is/2.

On the other hand, if light from the backlight 104 enters the photoelectric conversion section 124 of TFT sensor T1, that is, the user's finger or the like is not touching any of the division areas 11 in the first row, the drain current I1 through TFT sensor T1 increases consistently with the illuminance of the incident light.

If this increase is denoted by ΔIds, the drain current I1 through TFT sensor T1 when light enters the photoelectric conversion section 124 is expressed by I1=Id0+ΔIds.

As described above, the common sensor source line 123 for TFT sensor T0 and TFT sensor T1 is connected to the current source, resulting in the relationship Is=I0+I1. Thus, the drain current I0 in TFT sensor T0 decreases. The drain current I0 is expressed by I0=Id0−ΔIds.

Thus, drain currents I1 output by the respective division areas 11 in the first row are converted into voltages in parallel by the respective current-to-voltage conversion circuits each comprising the operational amplifier AMP1 and the resistor Rf. An output voltage from each operational amplifier AMP1 is −I1×RF (Vd=0), as is the case with FIG. 7.

As described above, the sensor driver 20 configured as shown in FIG. 22 and FIG. 23A also allows the dark current Id0 of the drain current I1 in TFT sensor T1 to be set to the given magnitude.

As described above, TFT sensor T0 and TFT sensor T1 disposed adjacent to each other to form a sensor pair are arranged close to each other and can thus be considered to have almost the same temperature. Hence, the dark current Id0 of the drain current I1 from TFT sensor T1 is prevented from being varied by temporal changes or temperature changes in TFT sensor T0 or TFT sensor T1.

Thus, the drain current I1 from TFT sensor T1 depends only on illuminance. Hence, voltage signals can be acquired with the adverse effects of temporal changes or temperature changes in TFT sensor T0 or TFT sensor T1 suppressed.

Furthermore, the configuration shown in FIG. 22 and FIG. 23A avoids including the buffer circuit BUF and thus enables the circuit scale of the sensor driver 20 to be reduced compared to the configuration shown in FIG. 7. Thus, when the display 10 is integrated with the sensor driver 20, the area of the sensor driver 20 can be reduced.

Furthermore, in the circuit shown in FIG. 22 and FIG. 23A, the current source CS is of the current intake type. However, the present embodiment is not limited to this configuration.

That is, the current source CS may be of a current discharge type as shown in FIG. 23B. This configuration can exert effects similar to those of the above-described configuration shown in FIG. 23A.

If the current source CS is of the current discharge type, the circuit configuration shown in FIG. 23A is modified such that the other end of the current source CS is connected to the voltage source configured to provide the voltage Vdd, whereas the drain electrode of TFT sensor T0 is connected to the voltage source configured to provide the voltage Vs (Vdd>Vs), as shown in FIG. 23B.

In the configuration shown in FIG. 22, FIG. 23A, and FIG. 23B, each of TFT sensor T0 and TFT sensor T1 comprises an n-channel TFT. However, the embodiments of the invention are not limited to this configuration. Each of TFT sensor T0 and TFT sensor T1 may comprise a p-channel TFT.

Figure 24:
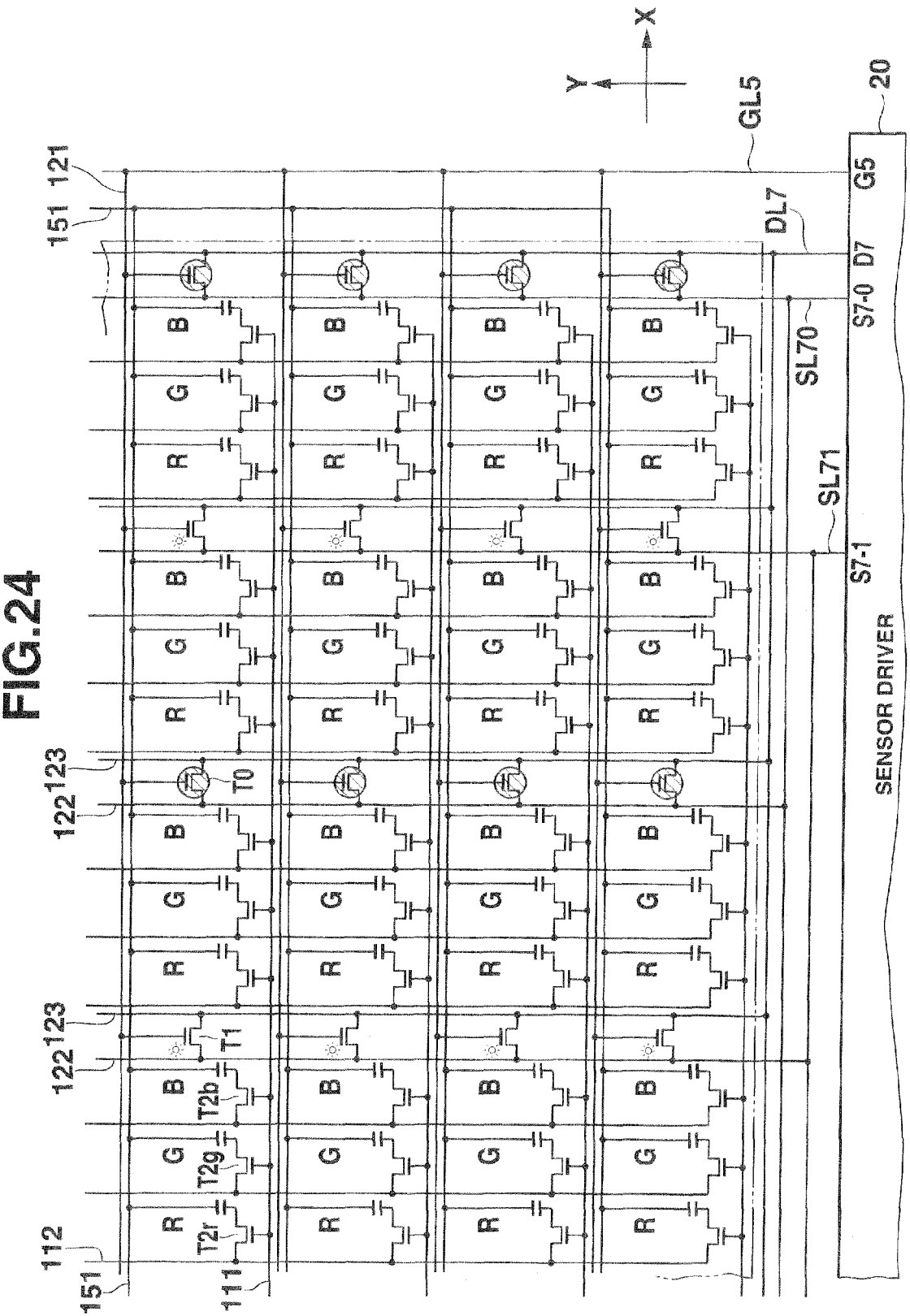
FIG. 24 is a diagram showing a detailed circuit configuration of a part of one division area 11 which corresponds to a portion A' of FIG. 20 when the sensor TFT is of a p-channel type according to the fifth embodiment.

FIG. 24 is a diagram showing a detailed circuit configuration of a part of one division area 11 which corresponds to portion A' of FIG. 20, the configuration corresponding to the case where each of TFT sensor T0 and TFT sensor T1 comprises a p-channel TFT.

Figure 25:
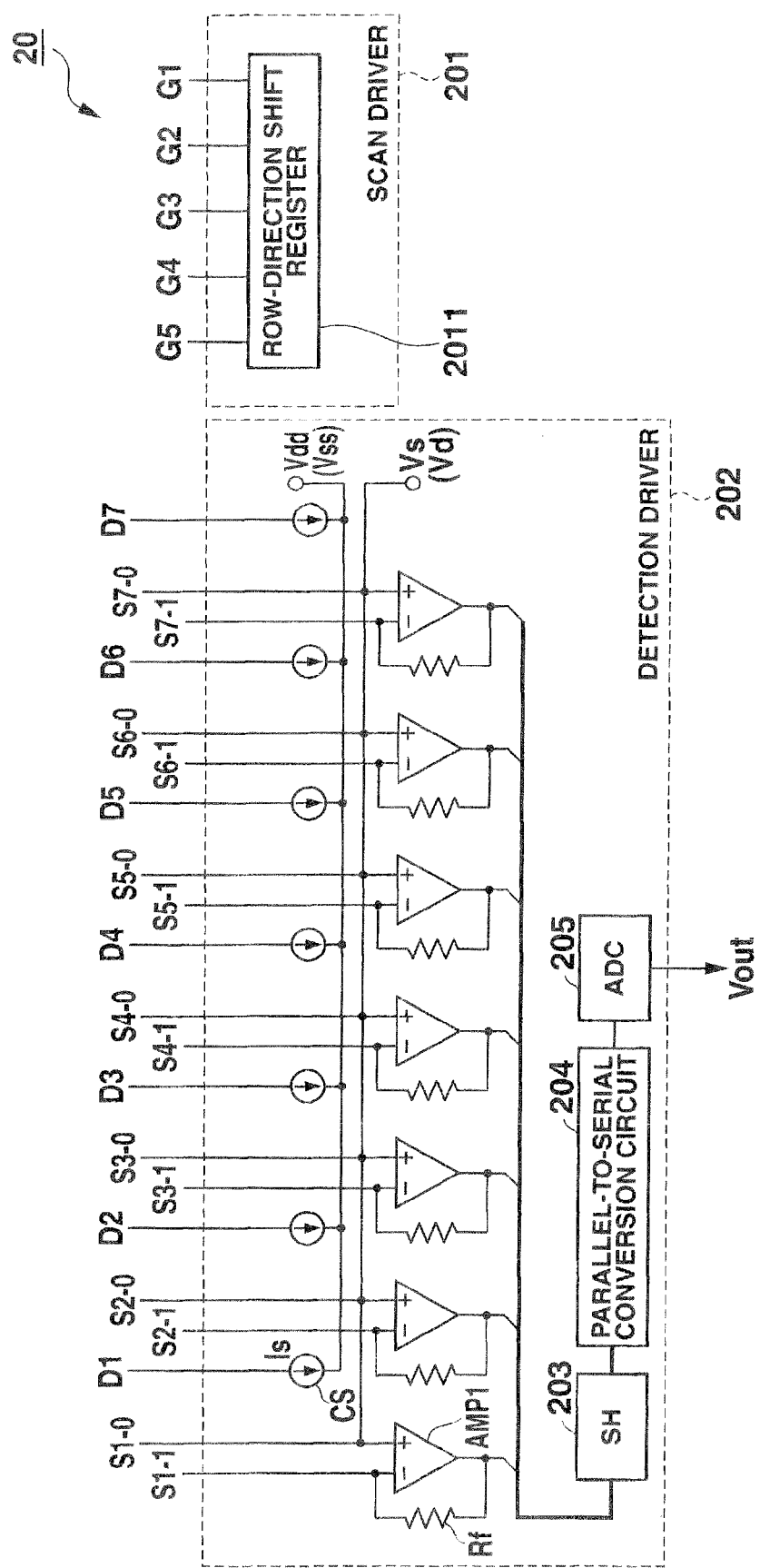
FIG. 25 is a circuit diagram showing an example of a configuration of a sensor driver corresponding to the sensor TFT of the p-channel type according to the fifth embodiment.

FIG. 25 is a circuit diagram showing an example of a configuration of the sensor driver 20 corresponding to the case where each of TFT sensor T0 and TFT sensor T1 comprises a p-channel TFT.

Figure 26A:
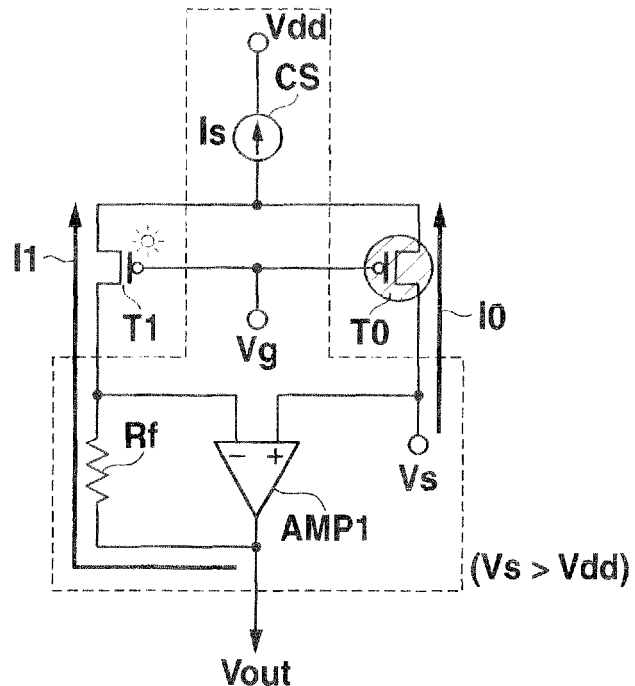
FIG. 26A is an equivalent circuit diagram of a drive circuit formed for one sensor pair by the sensor driver according to the fifth embodiment when the sensor TFT is of the p-channel type.

FIG. 26A is an equivalent circuit diagram of a drive circuit formed by the sensor driver 20 for one sensor pair when each of TFT sensor T0 and TFT sensor T1 comprises a p-channel TFT.

FIG. 25 is an equivalent circuit diagram of a drive circuit formed by the sensor driver 20 for one sensor pair when each of TFT sensor T0 and TFT sensor T1 comprises a p-channel TFT and when the current source CS is of the current discharge type.

In this case, in the configuration shown in FIG. 20 to FIGS. 23A and 23B, the drain terminal is replaced with the source terminal, whereas the source terminal is replaced with the drain terminal.

Specifically, as shown in FIG. 24, TFT sensors T0 arranged in the same column share one sensor source line 122. Moreover, shared sensor source lines 122 corresponding to one division area 11 are connected to a common source line SL70 outside the display area. The common source line SL70 is connected to a source terminal SL7-0 of the sensor driver 20.

Similarly, TFT ors T1 arranged in the same column share one sensor source line 122. Moreover, shared sensor source lines 122 corresponding to one division area 11 are connected to a common source line SL71 outside the display area. The common source line SL71 is connected to a source terminal SL7-1 of the sensor driver 20.

The sensor drain line 123 for TFT sensors T0 arranged in the same column and the sensor source line 123 for TFT sensors T1 arranged in the same column are joined together into a common sensor source line 123. Moreover, common sensor drain lines 123 corresponding to one division area 11 are connected to a common drain line DL7 outside the display area. The common drain line DL7 is connected to a drain terminal D7 of the sensor driver 20.

In the detection driver 202, source terminals Sm–0 (m=1, 2, ..., 7) connected to the source electrodes of TFT sensors T0 are each connected to the non-inverting input terminal of the operational amplifier AMP1. The voltage source configured to provide the potential Vs is connected to the non-inverting input terminals.

Source terminals Sm–1 (m=1, 2, ..., 7) connected to the source electrodes of TFT sensors T1 are each connected to the inverting input terminal of the operational amplifier AMP1.

The resistor R1 is connected between the inverting input terminal and the output terminal of the operational amplifier AMP1. The operational amplifier AMP1 and the resistor Rf form a current-to-voltage conversion circuit.

In addition, drain terminals Dm (m=1, 2, ..., 7) are connected to one end of the current source CS. The other end of the current source CS is connected to the voltage source configured to provide the voltage Vss (Vss<Vd). The current source CS is of the current intake type and allows the current Is to flow in an intake direction from the drain terminal Dm connected to one end of the current source CS to the voltage source Vdd connected to the other end.

As shown in FIG. 26A, the drain electrode of TFT sensor T0 and the drain electrode of TFT sensor T1 are connected to one end of the current source CS. The other end of the current source CS is connected to the voltage source configured to provide the potential Vdd (Vs>Vdd).

The gate electrode of TFT sensor T0 and the gate electrode of TFT sensor T1 are jointly connected to the voltage source configured to provide the voltage Vg.

The source electrode of TFT sensor T0 is connected to the non-inverting input terminal of the operational amplifier AMP1 and to the voltage source configured to provide the voltage Vs.

The source electrode of TFT sensor T1 is connected to the inverting input terminal of the operational amplifier AMP1.

The resistor Rf is connected between the inverting input terminal and the output terminal of the operational amplifier AMP1. The operational amplifier AMP1 and the resistor Rf form a current-to-voltage conversion circuit.

The operation of the sensor driver 20 performed when each of TFT sensors T0 and T1 comprises a p-channel TFT is similar to that described with reference to FIG. 22 and FIGS. 23A and 23B and will not be described.

Here, the current source CS may be of the current discharge type. In this case, the circuit configuration is as shown in FIG. 26B.

Figure 26B:
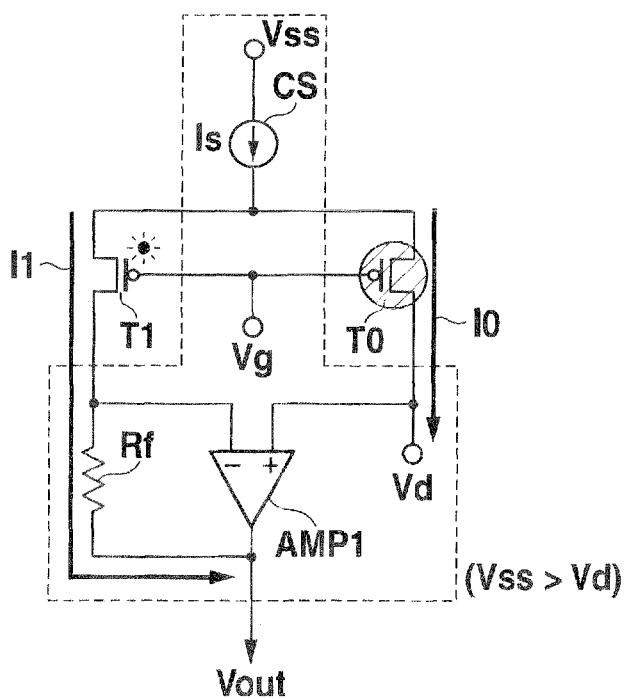
FIG. 26B is an equivalent circuit diagram of a drive circuit formed for one sensor pair by the sensor driver according to the fifth embodiment when the sensor TFT is of the p-channel type and when the current source CS is of the current discharge type.

In this case, the circuit configuration shown in FIG. 26A is modified such that the other end of the current source CS is connected to the voltage source configured to provide the voltage Vss and that the source electrode of TFT sensor T0 is connected to the voltage source configured to provide the voltage Vd (Vss>Vd), as shown in FIG. 26B.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical sensor device comprising: a first substrate; a plurality of optical sensor units two-dimensionally arranged on a surface of the first substrate; a scan driver which sets the optical sensor units disposed in each row in a selected state; and a detection driver which acquires detection signals corresponding to illuminance of incident light on the optical sensor units set in the selected state, wherein each of the optical sensor units comprises a first optical sensor including a first photoelectric conversion section blocked from light and a second optical sensor including a second photoelectric conversion section configured to change the illuminance in response to an externally applied external force, and the detection driver maintains each voltages of electrodes of the first optical sensors and each voltages of electrodes of the second optical sensors, which are set in the selected state, in equal voltage levels to each other, and acquires a plurality of voltage signals in parallel as the detection signals, wherein each of the voltage signals corresponds to current flowing in accordance with the illuminance on each of the second optical sensors set in the selected state.

2. The optical sensor device according to claim 1, further comprising:
    a second substrate comprising a surface located opposite to the surface of the first substrate and being provided at a predetermined distance from the surface of the first substrate;
    light blocking walls provided on the surface of the first substrate and the surface of the second substrate at positions surrounding the second semiconductor layer and configured to block visible light; and
    a gap formed between an upper end of the light blocking walls and the surface of the first substrate and the surface of the second substrate,
    wherein the gap forms an optical valve configured to narrow to block light to the second photoelectric conversion section of the second thin-film-transistor optical sensors when the external force is applied to the first substrate or the second substrate.

3. The optical sensor device according to claim 1, wherein the first optical sensors and the second optical sensors are made by thin-film-transistors, and
    the first photoelectric conversion section and the second photoelectric conversion section include semiconductor layers.

4. The optical sensor device according to claim 3, further comprising:
    a plurality of sensor-gate-lines which are disposed in the row direction and connected in common to gate electrodes of the first optical sensors and the second optical sensors which are disposed in the row direction;
    a plurality of first-sensor-first-signal-lines which are disposed in the column direction and connected to one of drain electrodes and source electrodes of the first optical sensors which are disposed in the column direction;
    a plurality of first-sensor-second-signal-lines which are disposed in the column direction and connected to the other one of the drain electrodes and the source electrodes of the first optical sensors which are disposed in the column direction;
    a plurality of second-sensor-first-signal-lines which are disposed in the column direction and connected to one of drain electrodes and source electrodes of the second optical sensors which are disposed in the column direction; and a plurality of second-sensor-second-signal-lines which are disposed in the column direction and connected to the other one of the drain electrodes and the source electrodes of the second optical sensors which are disposed in the column direction;

wherein the scan driver outputs, to each of the sensor-gate-lines, a sensor scan signal having a signal level at which the first optical sensors and the second optical sensors are turned on.

5. The optical sensor device according to claim 4, wherein the plurality of optical sensor units are divided in a plurality of optical sensor groups which are two-dimensionally arranged, each of the plurality of optical sensor groups include predetermined number of the optical sensor units disposed in predetermined number of rows and predetermined number of columns, a predetermined number of the sensor gate lines which are connected to each of the optical sensor groups arranged in a row direction, are connected to a common-sensor-gate-line in common and connected to the scan driver through the common-sensor-gate-line, a predetermined number of the first-sensor-first-signal-lines connected to each of the optical sensor groups arranged in a column direction are connected to a common-first-sensor-first-signal-line in common and connected to the detection driver through the common-first-sensor-first-signal-line, a predetermined number of the second-sensor-first-signal-lines connected to each of the optical sensor groups arranged in a column direction are connected to a common-second-sensor-first-signal-line in common and connected to the detection driver through the common-second-sensor-first-signal-line, a predetermined number of the first-sensor-second-signal-lines connected to each of the optical sensor groups arranged in a column direction are connected to a common-first-sensor-second-signal-line in common and connected to the detection driver through the common-first-sensor-second-signal-line, a predetermined number of the second-sensor-second-signal-lines connected to each of the optical sensor groups arranged in a column direction are connected to a common-second-sensor-second-signal-line in common and connected to the detection driver through the common-second-sensor-second-signal-line.

6. The optical sensor device according to claim 4, wherein the plurality of optical sensor units are divided in a plurality of optical sensor groups which are two-dimensionally arranged, each of the plurality of optical sensor groups include predetermined number of the optical sensor units disposed in predetermined number of rows and predetermined number of columns, a predetermined number of the sensor gate lines which are connected to each of the optical sensor groups arranged in a row direction, are connected to a common-sensor-gate-line in common and connected to the scan driver by the common-sensor-gate-line, a predetermined number of the first-sensor-first-signal-lines connected to each of the optical sensor groups arranged in a column direction are connected to a common-first-sensor-first-signal-line in common and connected to the detection driver by the common-first-sensor-first-signal-line, a predetermined number of the second-sensor-first-signal-lines connected to each of the optical sensor groups arranged in a column direction are connected to a common-second-sensor-first-signal-line in common and connected to the detection driver by the common-second-sensor-first-signal-line, a predetermined number of the first-sensor-second-signal-lines and a predetermined number of the second-sensor-second-signal-lines connected to each of the optical sensor groups arranged in a column direction are connected to a common-second-signal-line in common and connected to the detection driver by the common-second-signal-line.

7. The optical sensor device according to claim 4, further comprising:

a plurality of display pixels which are two-dimensionally arranged on the surface of the first substrate and each have an optical element;

a plurality of scan lines which are disposed in the row direction and connected to the display pixels which are disposed in the row direction; and a plurality of signal lines which are disposed in the column direction and connected to the display pixels which are disposed in the column direction, wherein the display pixels comprise a predetermined number of subpixels in different colors disposed in the row direction, and the first optical sensors and the second optical sensors are each provided in an area between the display pixels disposed in the row direction.

8. The optical sensor device according to claim 3, further comprising:

a plurality of current sources which are connected to each of the first-sensor-first-signal-lines and supply a current to each of the first-sensor-first-signal-lines;

a plurality of buffer circuits which are provided between each of the second-sensor-first-signal-lines and each of the first-sensor-first-signal-lines adjacent to one another and a input terminal of the buffer circuit is connected to each of the second-sensor-first-signal-lines and an output terminal of the buffer circuit is connected to each of the first-sensor-first-signal-lines;

a voltage source which is connected to each of the first-sensor-second-signal-lines and supply a voltage to the each of the first-sensor-second-signal-lines;

a plurality of current-to-voltage conversion circuits which are connected to each of the first-sensor-second-signal-lines and each of the second-sensor-second-signal-lines adjacent to one another and convert a current flowing through each of the second-sensor-second-signal-line into a plurality of voltage signals; and a parallel-to-serial conversion circuit which supplied the plurality of voltage signals in a form of parallel signals from the plurality of current-to-voltage conversion circuits and convert the parallel signals into a serial signal.

9. The optical sensor device according to claim 3, wherein the detection driver comprises:

a plurality of current sources which are connected in common to each of the first-sensor-first-signal-lines and each of the second-sensor-first-signal-lines adjacent to each other and supply a current to each of the first-sensor-first-signal-lines and each of the second-sensor-first-signal-lines;

a voltage source which is connected to each of the first sensor second signal lines and supply a voltage to each of the first sensor second signal lines;

a plurality of current-to-voltage conversion circuits which are connected to each of the first-sensor-second-signal-lines and each of the second-sensor-second-signal-lines adjacent to one another and convert a current flowing through each of the second-sensor-second-signal-line into a plurality of voltage signals; and a parallel-to-serial conversion circuit which supplied the plurality of voltage signals in a form of parallel signals from the plurality of current-to-voltage conversion circuits and convert the parallel signals into a serial signal.

10. The display apparatus according to claim 9, further comprising:

a plurality of sensor-gate-lines which are disposed in the row direction and connected in common to gate electrodes of the first optical sensors and the second optical sensors which are disposed in the row direction;

a plurality of first-sensor-first-signal-lines which are disposed in the column direction and connected to one of drain electrodes and source electrodes of the first optical sensors which are disposed in the column direction;

a plurality of first-sensor-second-signal-lines which are disposed in the column direction and connected to the other one of the drain electrodes and the source electrodes of the first optical sensors which are disposed in the column direction;

a plurality of second-sensor-first-signal-lines which are disposed in the column direction and connected to one of drain electrodes and source electrodes of the second optical sensors which are disposed in the column direction; and a plurality of second-sensor-second-signal-lines which are disposed in the column direction and connected to the other one of the drain electrodes and the source electrodes of the second optical sensors which are disposed in the column direction;

wherein the scan driver outputs, to each of the sensor-gate-lines, a sensor scan signal having a signal level at which the first optical sensors and the second optical sensors are turned on.

11. A display apparatus comprising: a substrate; a plurality of display pixels two-dimensionally arranged on a surface of the substrate; a plurality of optical sensor units two-dimensionally arranged on the surface of the substrate, each of the display pixels comprising an optical element; a scan driver which sets the optical sensor units disposed in each row in a selected state; and a detection driver which acquires detection signals corresponding to illuminance of incident light on the optical sensor units set in the selected state, wherein each of the optical sensors comprise units a first optical sensor including a first photoelectric conversion section blocked from light and a second optical sensor including a second photoelectric conversion section configured to change the illuminance in response to an externally applied external force, and the detection driver maintains each voltages of electrodes of the first optical sensors and each voltages of electrodes of the second optical sensors, which are set in the selected state, in equal voltage levels to each other, and acquires a plurality of voltage signals in parallel as the detection signals, wherein each of the voltage signals corresponds to current flowing in accordance with the illuminance on the second optical sensor set in the selected state.

12. The display apparatus according to claim 11, wherein the first optical sensors and the second optical sensors are made by thin-film-transistors, the first photoelectric conversion section and the second photoelectric conversion section include semiconductor layers.

13. The display apparatus according to claim 12, wherein the plurality of optical sensor units are divided in a plurality of optical sensor groups which are two-dimensionally arranged, each of the plurality of optical sensor groups include predetermined number of the optical sensor units disposed in predetermined number of rows and predetermined number of columns, a predetermined number of the sensor gate lines which are connected to each of the optical sensor groups arranged in a row direction, are connected to a common-sensor-gate-line in common and connected to the scan driver by the common-sensor-gate-line, a predetermined number of the first-sensor-first-signal-lines connected to each of the optical sensor groups arranged in a column direction are connected to a common-first-sensor-first-signal-line in common and connected to the detection driver by the common-first-sensor-first-signal-line, a predetermined number of the second-sensor-first-signal-lines connected to each of the optical sensor groups arranged in a column direction are connected to a common-second-sensor-first-signal-line in common and connected to the detection driver by the common-second-sensor-first-signal-line, a predetermined number of the first-sensor-second-signal-lines and a predetermined number of the second-sensor-second-signal-lines connected to each of the optical sensor groups arranged in a column direction are connected to a common-second-signal-line in common and connected to the detection driver by the common-second-signal-line.

14. The display apparatus according to claim 11, wherein the plurality of optical sensor units are divided in a plurality of optical sensor groups which are two-dimensionally arranged, each of the plurality of optical sensor groups include predetermined number of the optical sensor units disposed in predetermined number of rows and predetermined number of columns, a predetermined number of the sensor gate lines which are connected to each of the optical sensor groups arranged in a row direction, are connected to a common-sensor-gate-line in common and connected to the scan driver through the common-sensor-gate-line, a predetermined number of the first-sensor-first-signal-lines connected to each of the optical sensor groups arranged in a column direction are connected to a common-first-sensor-first-signal-line in common and connected to the detection driver through the common-first-sensor-first-signal-line, a predetermined number of the second-sensor-first-signal-lines connected to each of the optical sensor groups arranged in a column direction are connected to a common-second-sensor-first-signal-line in common and connected to the detection driver through the common-second-sensor-first-signal-line, a predetermined number of the first-sensor-second-signal-lines connected to each of the optical sensor groups arranged in a column direction are connected to a common-first-sensor-second-signal-line in common and connected to the detection driver through the common-first-sensor-second-signal-line, a predetermined number of the second-sensor-second-signal-lines connected to each of the optical sensor groups arranged in a column direction are connected to a common-second-sensor-second-signal-line in common and connected to the detection driver through the common-second-sensor-second-signal-line.

15. The display apparatus according to claim 11, wherein each of the display pixels comprises a liquid crystal display pixel as the optical element.

16. The display apparatus according to claim 11, wherein each of the display pixels comprises an organic electroluminescence element as the optical element.

17. a display apparatus comprising:
a substrate; a plurality of display pixels which are two-dimensionally arranged on the surface of the substrate and each have an optical element; and a plurality of optical sensor units two-dimensionally arranged on the surface of the substrate, each of the display pixels comprising an optical element a scan driver which sets the optical sensor units disposed in each row in a selected state; a detection driver which acquires detection signals corresponding to illuminance of incident light un the optical sensor units set in the selected state, wherein each of the optical sensor units comprises a first optical sensor including a first photoelectric conversion section blocked from light and a second optical sensor including a second photoelectric conversion section configured to chance the illuminance in response to an externally applied external force, the display pixels comprise a predetermined number of subpixels in different colors disposed in the row direction, the first optical sensors and the second optical sensors are each provided in an area between the display pixels disposed in the row direction; and the detection driver maintains each voltages of electrodes of the first optical sensors and each voltages of electrodes of the second optical sensor, which are set in the selected state in equal voltage levels to each other, and acquires a plurality of voltage signals in parallel as the detection signals, wherein each of the voltage signals corresponds to current flowing in accordance with the illuminance on each of the second optical sensors set in the selected state.

18. The display apparatus according to claim 17, wherein the first optical sensors and the second optical sensors are made by thin-film-transistors,
the first photoelectric conversion section and the second photoelectric conversion section include semiconductor layers.

19. The display apparatus according to claim 18, further comprising:
a plurality of scan lines which are disposed in the row direction and connected to the display pixels which are disposed in the row direction;
a plurality of signal lines which are disposed in the column direction and connected to the display pixels which are disposed in the column direction;
a plurality of sensor-gate-lines which are disposed in the row direction and connected in common to gate electrodes of the first optical sensors and the second optical sensors which are disposed in the row direction;
a plurality of first-sensor-first-signal-lines which are disposed in the column direction and connected to one of drain electrodes and source electrodes of the first optical sensors which are disposed in the column direction;
a plurality of first-sensor-second-signal-lines which are disposed in the column direction and connected to the other one of the drain electrodes and the source electrodes of the first optical sensors which are disposed in the column direction;
a plurality of second-sensor-first-signal-lines which are disposed in the column direction and connected to one of drain electrodes and source electrodes of the second optical sensors which are disposed in the column direction; and
a plurality of second-sensor-second-signal-lines which are disposed in the column direction and connected to the other one of the drain electrodes and the source electrodes of the second optical sensors which are disposed in the column direction.

20. The display apparatus according to claim 19, further comprising a plurality of first display pixel groups two-dimensionally arranged,
each of the first display pixel groups include an even number of the display pixels disposed adjacent to one another in the column direction,
the first optical sensors and the second optical sensors are alternately disposed along the row direction in areas between the first display pixel groups arranged adjacent to each other in the row direction,
the sensor-gate-lines are provided in areas between half number of the display pixels of the first display pixel group, and
the scan lines are provided in areas between each of the first display pixel groups in the column direction.

21. The display apparatus according to claim 20, wherein length of the first and second optical sensors in the column direction are equal to or smaller than length of the first display pixel group in the column direction.

22. The optical sensor device according to claim 19, further comprising a plurality of second display pixel groups two-dimensionally arranged,
each of the second display pixel groups include an even number of the display pixels disposed adjacent to one another in the row direction,
the first optical sensors and the second optical sensors are alternately provided along the row direction in areas between half number of the display pixels of the second display pixel group,
the first-sensor-first-signal-lines, the first sensor-second-signal-lines, the second-sensor-first-signal-lines, and the second-sensor-second-signal-lines are provided in areas between half number of the display pixels of the second display pixel group, and
the signal lines are provided in areas except the areas between half number of the display pixels of the second display pixel group.

23. The display apparatus according to claim 22, wherein length of the first and second optical sensors in the column direction are equal to or smaller than length of the display pixel in the column direction.

24. The optical sensor device according to claim 19, further comprising a plurality of third display pixel groups two-dimensionally arranged,
each of the third display pixel groups include an even number of the display pixels disposed in each of the column direction and the row direction,
the first optical sensors and the second optical sensors are alternately provided along the row direction in areas between half number of the display pixels of the third display pixel group in the row direction,
the sensor-gate-lines are provided in areas between half number of the display pixels of the third display pixel group in the column direction, the first-sensor-first-signal-lines, the first sensor-second-signal-lines, the second-sensor-first-signal-lines, and the second-sensor-second-signal-lines are provided in areas between half number of the display pixels of the third display pixel group in the row direction, the scan lines are provided in areas between each of the third display pixel groups in the column direction, and the signal lines are provided in areas except the areas between half number of the display pixels of the third display pixel group in the row direction.

25. The display apparatus according to claim 24, wherein length of the first and second optical sensors in the column direction are equal to or smaller than the third display pixel group in the column direction.

26. A method for driving an optical sensor device comprising a plurality of optical sensor units two-dimensionally arranged, each of the optical sensor units comprising a first optical sensor including a first semiconductor layer blocked from light and a second optical sensor including a second semiconductor layer configured to change an illuminance of incident light in response to an externally applied external force, the method comprising:

setting the first optical sensors and the second optical sensors disposed in each of the rows in a selected state; and maintaining each voltages of electrodes of the first optical sensors and second optical sensors and each voltages of electrodes of the second optical sensors, which are set in the selected state, in equal voltage levels to each other, and then acquiring a plurality of voltage signals in parallel, the voltage signals corresponding to currents flowing in accordance with the illuminance on the second optical sensors.

27. The method for driving an optical sensor device according to claim 26, further comprising acquiring the plurality of voltage signals as parallel signals, and converting the parallel signals into a serial signal, and outputting the serial signal.

28. The method for driving an optical sensor device according to claim 26, wherein the first optical sensors and the second optical sensors are made by thin-film-transistors, the acquiring comprises:

supplying a current to one of the drain electrode and source electrode of each of the first optical sensors;

outputting a floating voltage of the one of the drain electrode and source electrode of each of the first optical sensors set in the selected state which the floating voltage is generated by a current flowing between the drain electrode and source electrode of each of the first optical sensors, to one of the drain electrode and source electrode of each of the corresponding second optical sensors via a buffer circuit;

applying a voltage to the other of the drain electrode and source electrode of each of the first optical sensors;

subjecting the other of the drain electrode and source electrode of each of the first optical sensors set in the selected state and the other of the drain electrode and source electrode of each of the second optical sensors to imaginary short-circuiting by a operational amplifier and to set them in an equal voltage level; and converting a current flowing between the drain electrode and source electrode of each of the second optical sensor into the voltage signal.

29. The method for driving an optical sensor device according to claim 26, wherein the first optical sensors and the second optical sensors are made by thin-film-transistors, the acquiring comprises:

connecting one of the drain electrode and source electrode of each of the first optical sensors to one of the drain electrode and source electrode of each of the corresponding second optical sensors to a connection point and supplying a current to the connection point;

applying a voltage to the other of the drain electrode and source electrode of each of the first optical sensors;

subjecting the other of the drain electrode and source electrode of each of the first optical sensors set in the selected state and the other of the drain electrode and source electrode of each of the second optical sensors to imaginary short-circuiting by a operational amplifier and to set them in an equal voltage level; and converting a current flowing between the drain electrode and source electrode of each of the second optical sensor into the voltage signal.

* * * * *